United States Patent
Esposito et al.

(10) Patent No.: US 10,467,426 B1
(45) Date of Patent: Nov. 5, 2019

(54) METHODS AND SYSTEMS TO MANAGE DATA OBJECTS IN A CLOUD COMPUTING ENVIRONMENT

(71) Applicant: BetterCloud, Inc., New York, NY (US)

(72) Inventors: David Anthony Esposito, Atlanta, GA (US); Peter Bilali, New York, NY (US); David Kenneth Hardwick, Atlanta, GA (US); David Eli Politis, New York, NY (US)

(73) Assignee: BetterCloud, Inc., New York, NY (US)

( * ) Notice: Subject to any disclaimer, the term of this patent is extended or adjusted under 35 U.S.C. 154(b) by 0 days.

(21) Appl. No.: 16/232,507

(22) Filed: Dec. 26, 2018

(51) Int. Cl.
| | |
|---|---|
| G06F 21/62 | (2013.01) |
| H04L 29/06 | (2006.01) |
| G06F 21/60 | (2013.01) |
| G06F 16/23 | (2019.01) |
| G06F 9/448 | (2018.01) |
| G06F 16/2455 | (2019.01) |

(52) U.S. Cl.
CPC ........ *G06F 21/6236* (2013.01); *G06F 9/4493* (2018.02); *G06F 16/23* (2019.01); *G06F 16/24564* (2019.01); *G06F 21/604* (2013.01); *H04L 63/102* (2013.01); *G06F 2221/2141* (2013.01)

(58) Field of Classification Search
CPC .............. G06F 21/6236; G06F 9/4493; G06F 16/24654; G06F 16/23; G06F 21/604; G06F 2221/2141; G06F 16/24564; H04L 63/102
See application file for complete search history.

(56) References Cited

U.S. PATENT DOCUMENTS

| | | |
|---|---|---|
| 9,203,707 B1 | 12/2015 | Hasija et al. |
| 9,348,687 B2 | 5/2016 | Boger |
| 9,369,433 B1* | 6/2016 | Paul .................... H04L 63/0227 |
| 9,442,700 B2 | 9/2016 | Sarid |
| 9,521,035 B2 | 12/2016 | Ganguly et al. |
| 9,928,377 B2 | 3/2018 | Narayanaswamy et al. |
| 10,019,437 B2 | 7/2018 | Ho et al. |
| 10,042,685 B1 | 8/2018 | O'Kennedy et al. |

(Continued)

FOREIGN PATENT DOCUMENTS

| | | |
|---|---|---|
| WO | WO2016137650 A1 | 9/2016 |
| WO | WO2015047467 A1 | 1/2019 |

OTHER PUBLICATIONS

Chandran et al., "Data Management Issues in Cloud Integrated Computing: A Big Picture", Jan. 2017, IEEE, pp. 1-8. (Year: 2017).*

(Continued)

*Primary Examiner* — Matthew Smithers

(57) ABSTRACT

The present disclosure relates to a platform that manages activity taken with respect to cloud-based software services. The platform manages data objects processed by software services and/or those entities that initiate processing events. The platform uses various identifiers such as, for example, a persistence identifier (PID) to track processing events. The platform implements rules and/or permissions related to the managed data objects and/or managed entities to determine whether processing events are in compliance. The platform may update database records, send alerts, send data graphs, or provide a real-time stream related to the managed data objects and/or managed entities.

20 Claims, 6 Drawing Sheets

(56) References Cited

U.S. PATENT DOCUMENTS

| | | | |
|---|---|---|---|
| 2012/0096525 A1* | 4/2012 | Bolgert | G06F 11/3006 726/6 |
| 2016/0080422 A1 | 3/2016 | Belgodere et al. | |
| 2016/0087854 A1* | 3/2016 | Jayanti Venkata | G06F 8/60 709/224 |
| 2016/0253079 A1 | 9/2016 | Hasija et al. | |
| 2016/0275303 A1* | 9/2016 | Narayanaswamy | G06F 21/6218 |
| 2016/0337175 A1* | 11/2016 | Rao | H04L 49/25 |
| 2017/0010902 A1 | 1/2017 | Sarid et al. | |
| 2017/0185793 A1 | 6/2017 | Rotem et al. | |
| 2017/0235973 A1 | 8/2017 | Doshi | |
| 2017/0264619 A1 | 9/2017 | Narayanaswamy et al. | |
| 2017/0353565 A1* | 12/2017 | Kumar | H04L 67/22 |
| 2018/0027006 A1* | 1/2018 | Zimmermann | H04L 63/0245 726/11 |
| 2018/0034703 A1* | 2/2018 | Anholt | H04L 12/4641 |
| 2018/0048725 A1 | 2/2018 | Doshi | |

OTHER PUBLICATIONS

Yang et al., "Data Service Portal for Application Integration in Cloud Computing", 2011, IEEE, pp. 1-3. (Year: 2011).*

BetterCloud, Inc., "Fixing It's Blind Spots: 8 Critical Security and Management Policies to Implement in Your Saas Environment," https://www.bettercloud.com/resource/whitepaper-fixing-its-blind-spots/ (US).

Danielis, P., et al. (Sep. 2015). DuDE-Cloud: A resilient high performance cloud. Published in 2015 IEEE 20th Conference on Emerging Technologies & Factory Automation (ETFA), pp. 1-7. (DOI: 10.1109/ETFA.2015.7301658.).

Chang, V., et al. "Cloud computing adoption framework: A security framework for business clouds." Future Generation Computer Systems57 (2016): 24-41, (U.S.).

Subashini, S. et al. "A survey on security issues in service delivery models of cloud computing." Journal of network and computer applications 34.1 (2011): 1-11. (U.S.).

Almorsy, M., et al. "An analysis of the cloud computing security problem," arXiv preprint arXiv:1609.01107 (2016). (Australia).

Puthal, D., et al. "Cloud computing features, issues, and challenges: a big picture." Computational Intelligence and Networks (CINE), 2015 International Conference on. IEEE, 2015. (DOI:10.1109/CINE.2015.31).

Hashmi, A., et al. "Security and Compliance Management in Cloud Computing." international Journal of Advanced Studies in Computers, Science and Engineering 7.1 (2018): 47-54. (www.ijascse.org.).

Cloud Standards Customer Council, "Interoperability and Portability for Cloud Computing: A Guide." Version 2.0. https://www.omg.org/cloud/deliverables/CSCC-Interoperability-and-Portability-for-Cloud-Computing-A-Guide.pdf.

Politis, D. Controlling Your SaaS Environment: A Six-Part Framework for Effectively Managing and Securing Saas Applications, Published by BetterCloud. Inc. (www.controlyoursaas.com.) (US).

* cited by examiner

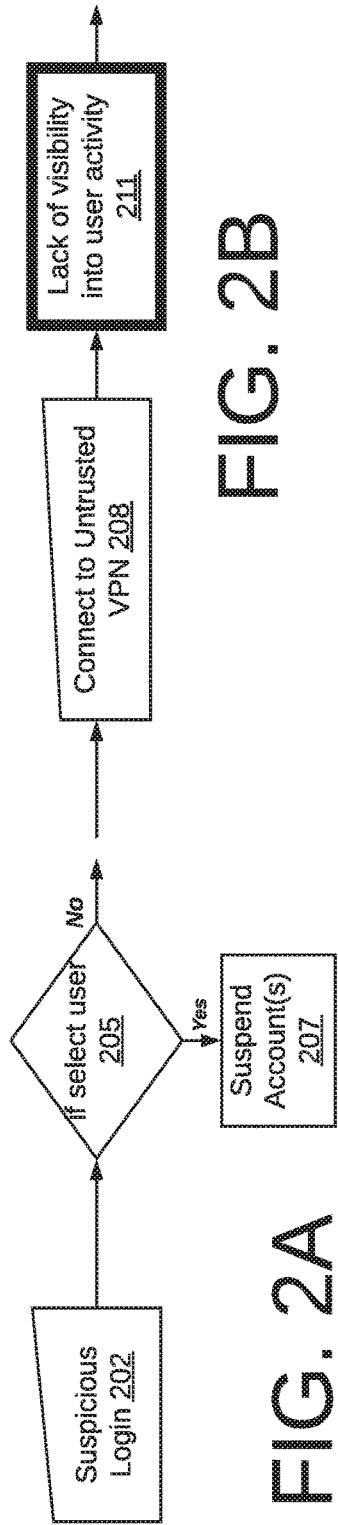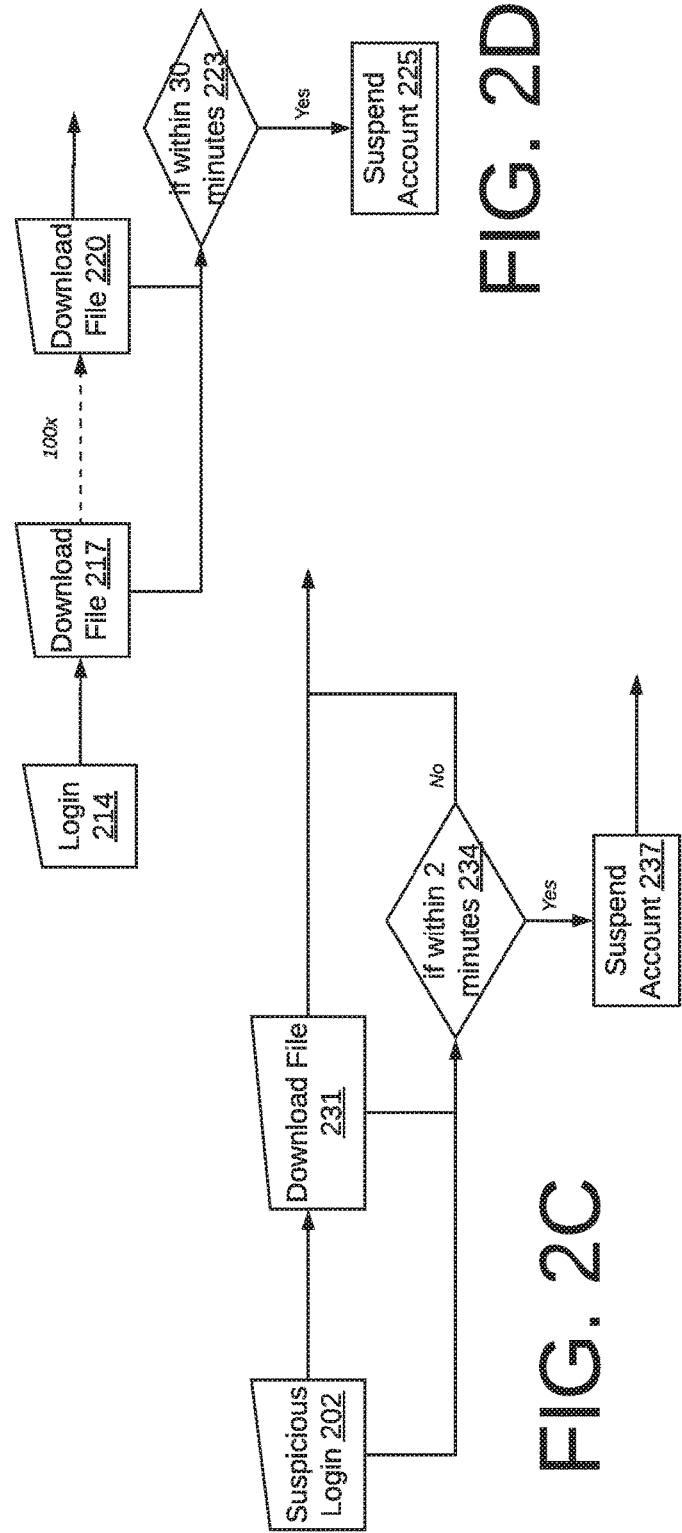

METHODS AND SYSTEMS TO MANAGE DATA OBJECTS IN A CLOUD COMPUTING ENVIRONMENT

FIELD OF THE INVENTION

The disclosure relates to methods and systems for managing data objects (e.g., files, calendars, users, groups, devices, hardware, etc.) operational with a plurality of SaaS applications in a cloud computing environment. Embodiments of the present disclosure are implemented in a cloud computing environment made up of a combination of computer hardware and software. The hardware may include one or more servers configured in a distributed environment to provide software services at one or more client devices. Client devices may run instances of server-side software applications. Client devices uses these software services to manipulate data objects.

BACKGROUND OF THE INVENTION

Software as a service ("SaaS") applications are experiencing rapid adoption in today's corporate environments. Such software solutions enable collaboration by employees with people both inside and outside of their organizations. Moreover, SaaS applications can allow accelerated deployment of the right software solutions at the right time as needed for tasks that arise in an organization.

From the employee side, SaaS applications can be the epitome of a "no brainer." Employees, especially those who have matured in the era of the evolution of cloud computing over the last 10 or so years, generally cannot fathom a world where they do not have access to the best software tools that are available to them to do their jobs at the precise time needed. Moreover, in smaller companies, these SaaS application-competent employees are often a primary-if not the primary-driver of software acquisition decisions because, quite simply, smaller organizations will typically be less likely to have a formal IT department that vets and selects software for implementation in the company. There also often may not be a corporate infrastructure to manage use of the software on an ongoing basis, which may mean that the software acquisition process will continue to be SaaS applications-focused as the company begins to grow. Critically, if these companies scale to a size where a formal IT structure becomes appropriate, the "legacy" SaaS applications may be so embedded within the functions of the company that the existing SaaS applications ecosystem may be carried forward given the likely difficulty of disaggregating a myriad of individually deployed software products that have become central to the operations of the company. Thus, it follows that, once adopted, SaaS applications can be expected to remain in place in a growing organization, and any issues existing with their use will need to be addressed at some time during the company's lifecycle.

Even for mature companies that have implemented formal, embedded IT infrastructures, SaaS application use likely cannot be avoided in the future. As noted, today's employees expect SaaS applications to be available. In organizations that seek to restrict access to SaaS applications, it can be expected that employees will generate work-arounds to give themselves access to the programs they seek, with this perception likely being driven by an expectation that "it is easier to ask for forgiveness than to ask for permission." Such unauthorized SaaS application-related software, by definition, will not be visible to IT administrators because the users, in fact, intend for them to be hidden from management. Accordingly, IT administrators would not be able to see the actions of users, or "processing events," with regard to data that must be managed by an organization. For example, sensitive, regulated, and compliance-related data must be managed to maintain its value and, in many cases, to avoid legal liability. Data that travels through and among these unauthorized—and invisible to management—SaaS applications, will be difficult, if not impossible, to properly manage under current computing frameworks. A modem corporate IT policy would prefer not allow employees to utilize SaaS applications programs in their work. There thus currently exists an inherent tension between the likely behavior of employees and IT administrators in the context of SaaS application usage.

To further complicate the modern IT department management structure, persons that need access to sensitive or compliance-related data may not be employed by the organization. For example, consultants, contractors, and freelancers are increasingly engaged to complete company-critical projects, even at larger organizations. These non-employee users will often access sensitive or compliance-related information via SaaS applications on an as-needed basis, even though corporate IT does not always have visibility to their operating systems and/or devices. Such external users will then not be directly subject to the organization's policies, which makes it even more tenuous for the organization's IT department to manage data flow proximate to them. It follows that the organization's obligations to protect sensitive, regulated, and compliance-related data may not be appropriately manageable for these non-employee users in today's computing environments.

This lack of visibility can also extend to the employees themselves: organizations are increasingly allowing employees to "bring their own devices." This eliminates the often-cumbersome need for employees to carry multiple devices in which one device is appropriated for business use, and the other appropriated for personal use. As opposed to assigning devices to employees to allow IT departments to manage the flow of data through and among that known—and therefore managed—device, IT departments may generally not be given broad access to such personal devices. Such merging of personal information with business information on this single device can therefore result in a lesser ability of an organization to gain access to the device so as to manage corporate data that travels on or through that device. This is at least because of employee privacy issues that may preclude the employer from gaining access to personal data, even if for the purpose of managing the valuable data of the organization. As a result, organizations are finding it problematic to manage data in the evolving situation where employees demand that their employers amend their corporate policies to allow the use of personal devices for the convenience and comfort of the employee, instead of vice versa.

The evolving SaaS applications IT ecosystem gives rise a new problem of data management in an accessible computing environment where access to functionalities and data are provided on demand. That is, in the legacy IT world, access to programs, data, etc. was granted from the IT administrator side of the organization. Employees, devices, and the like were authorized on a server, database, etc. and policies/permissions were applied to grant various levels of access or functionalities thereto. However, in the SaaS computing environment, this command and control system is not possible because there is typically little if any interaction of IT administrators with the underlying SaaS applications program in that the functionalities generated by the respective SaaS programs reside at the application level. This can mean that, not only does an IT department possibly not hold knowledge that a particular SaaS program is being utilized in corporate operations, IT administrators may not be able to manage the movement of sensitive, regulated, or compliance-related data through and among the various programs. In short, one cannot manage what cannot be seen, and data that is transferred at the application level may not be visible to administrators for reasons discussed herein.

Notably, proprietary data holds its value only as long as it remains confidential. As such, data breaches involving proprietary data can result in significant destruction of corporate value. Government regulations also set forth strict requirements for disclosure of regulated data. Indeed, disclosure of some types of data, for example, protected health data, is actionable even if the disclosure was inadvertent and even if no one actually accessed the data. It follows that the reduced ability to manage the transfer of managed data in a SaaS application-driven ecosystem does not reduce the obligations of IT departments to ensure the protection of such data.

To this end, it is not uncommon today for there to be news reports of data breaches in which managed data (e.g., social security numbers, protected health information, personnel records, trade secret information, etc.) have been inappropriately disclosed, even innocently. For example, an employee may access an online document signing SasS program. When a document is uploaded to the cloud to generate the e-signature, any information in that document will also be uploaded. If that information is private, sensitive, regulated etc., the act of uploading the document may constitute a legally actionable data breach.

In yet a further complication that transcends the issues of the evolving cloud computer IT ecosystem and user devices, there exists the overriding problem of SaaS application interoperability. In fact, issues of data and object management in a SaaS computing environment can be traced, at least in part, to issues with the interoperability between and among different SaaS applications that are intended to be functional with and among each other in a cloud computing environment. As would be recognized, SaaS application functionality is imparted by one or more APIs associated with a service or a product. It follows that the coding used to generate each API will underpin the ability of APIs to work together to accomplish a user goal. It can be expected that a single SaaS application vendor will standardize APIs within its own product offerings, at least to ensure that all of the APIs delivered by that single vendor will exhibit interoperability within the vendor's overall product platform. However, standardization among SaaS application vendors is not currently the norm. In other words, the SaaS applications that work together in a single cloud computing environment are likely to be "heterogeneous," in some respects which, in turn, can lead to some lack of interoperability.

Vendors of platform-level products (e.g., Microsoft, Atlassian, Google, Facebook, etc.) issue documentation for developers creating APIs that will be operable with the respective vendor's offerings. While any APIs developed to run on these platforms will be based on standard programming language used for APIs (e.g., Restful APIs, SOAP, etc.), these platforms will typically include proprietary features that can influence the coding used to create these applications. This effectively means that differences will exist between SaaS applications developed to run on each of these platforms with the result often being that interoperability problems can exist between applications that are intended to be functional with multiple platforms. User operability among various platforms can therefore be comprised.

Many potentially relevant SaaS applications for a cloud computing environment may be created by smaller companies, or even individuals, to solve very specific functionality needs, for example, as a "microservice" to drive a specific hardware product. These products are often generated from a "Lean Startup" framework. To this end, developers that are generating new products will create and test individual SaaS applications that are no more than "Minimum Viable Products" ("MVPs") to determine whether a scalable market might exist. As dictated by "Lean Startup" principles, these MVPs are created to be just "good enough" to test a product concept. While the developers may generally adhere to development guidelines and associated coding conventions, the goal of such development is to get a testable product to the market as quickly as possible. As such, best practices in software development may not be strictly adhered to, at least at an early stage. Moreover, often the developers of these SaaS products are not professional developers, which would make it less likely that generated applications would closely conform to guidelines for API development. If market testing of a product associated with the application is successful, Lean Startup principles dictate that the company move ahead quickly to be able to capture and scale the market opportunity. This means that an application will be built upon, and any features present in the foundational aspects of the SaaS product will be propagated into the future. While IT administrators would vet and accept applications in previous generations of computing infrastructures, it would be apparent that users can be expected to select a SaaS application based on needed functionality, not on the underlying coding and interoperability thereof with a broader computing ecosystem.

Whether due to the variability between the proprietary API development guidelines set out for platforms or "bespoke" programming features that can be incorporated in a SaaS application, data object structuring resulting from processing of the object in each application can vary within and among vendors. Such differences may be subtle or marked, but the mere existence of deviations in data object structuring can greatly increase the complexity of managing the operations of SaaS applications programs by an IT department, especially in the context of managing data movement inside and outside of an organization.

The problem of inconsistencies in the processing of data in and among a plurality of SaaS applications is compounded by the sheer amount of information that must be actively managed in the modem IT infrastructure. To this end, every SaaS application has a web of data objects that reference, interact, control, and/or rely on each other. Examples include, in a non-exclusive listing, users, groups of users, database records (e.g., acquired data, tasks, opportunities, contacts, calendars, chats), mailboxes, files, folders, third-party applications (e.g., that have been installed from app marketplaces and authorized by users), logs, metadata, permissions, devices, policies, or phone numbers (e.g., numbers assigned to multiple endpoints like mobile applications, IP desk phones, and/or softphones that are included off an interactive voice response [IVR]/call tree). This web of data objects becomes inherently more complex in multi-SaaS application environments. For example, data objects may be connected (or overlap) across applications, but may nonetheless not be aware of each other. This "sprawl" means that is as yet no single place to view them all, such as in a dashboard format, for example.

As SaaS application adoption grows, so will the amount of data living in SaaS applications, which in turn creates an enormous, decentralized information sprawl. Where SaaS data lives, and the questions of who has access to it and where it is exposed, become nebulous, even while the need for managing this data becomes more stringent. Thus, a significant issue with SaaS application sprawl is that valuable corporate data becomes scattered across dozens of cloud applications, making it difficult to find, analyze, and deploy. The owner of the data may not know what cloud apps retain or have access to its data. This sprawl becomes amplified when companies have multiple instances of SaaS applications. For example, many companies have separate accounts of Slack, Zendesk, and/or Salesforce per department, business unit, or office location. The SaaS applications data in these environments can be even more fragmented because the same data may be distributed within and siloed across multiple implementations of the same SaaS program in the same organization.

For example, different departments in a company may generate different implementations of Salesforce based on individual needs, preferences, etc. It may follow that interoperability within the same organization between these implementations of the same SaaS program from the same vendor may be compromised as a result. It should be apparent that since some or all of the configuration and operation of these individual instances of a SaaS application (e.g., Salesforce, Slack etc.) are at a department level, IT administrators may not be able to ensure interoperability. Nonetheless, the need to manage data objects operating in the organization's cloud computing environment is not reduced.

The amount of operational data that each SaaS application generates can be overwhelming, as well. In G Suite, for example, an audit log entry is created every time a user views, creates, previews, prints, updates, deletes, downloads, or shares Drive content. Similarly, Salesforce's event-monitoring API creates event log files for logins, logouts, API calls, API executions, report exports, Visualforce page loads, and more. When multiplied by tens, hundreds, or thousands of users, it is apparent that the amount of information that needs to be managed to ensure that an organization properly stewards its data can quickly become unmanageable. This problem is compounded by the fact that an organization's data is continuously being changed, deleted, and added to on a continuous basis, often by many people.

As companies increasingly adopt SaaS applications, critical information is located across a number of distinct sources rather than stored locally on physical endpoints such as users' devices and on-premises servers. There is no consistency across SaaS applications. In multi-SaaS environments, settings are adjusted in different places (e.g., an admin console vs. a Team Settings page). Each application has its own "data silo," even while data overlaps. For instance, Drive and Dropbox files can be shared in Slack. Depending on the environment, a user may be able to install as many third-party applications (e.g., Chrome extensions, bots, or marketplace applications) as he would like. Many of these SaaS applications work together in some way, and all it takes is one seemingly innocuous application integration to constitute a value-destroying data breach. Data objects all have different nomenclatures (e.g., a "group" vs. a "channel"). There is no single unified view or administrative vocabulary across SaaS applications for IT professionals. Not only does this mean IT departments must visit multiple disparate administrative consoles (e.g., dashboards) to carry out administrative tasks, but it also means they have no global view of their overall computing environment. Ultimately, this type of SaaS sprawl means IT has little to no control over what enters the environment. Without the ability to manage data flow among a plurality of SaaS applications, or to centralize and view its organization's data, IT departments lack effective oversight. This impairs the capacity to understand what's even happening in the environment.

It follows that the shift to SaaS applications requires new frameworks and tools to allow IT professionals to manage, secure, and support applications that are critical to the operation of their organizations. However, currently, there exists no structured way to manage enterprise SaaS applications, nor are there tools and techniques that can facilitate IT professionals' achieving their security goals and requirements with respect to data moving in and among various users, programs, and devices in cloud computing environments. In short, there remains a need for improvements in the ability to manage data objects in a computing environment that comprises a plurality of SaaS applications. The present disclosure provides these, and other, benefits.

SUMMARY OF THE INVENTION

The present disclosure is directed to a management platform that manages entities (e.g., a user, user groups, etc.) who use heterogeneous software services (e.g., SaaS applications) to process data objects within a cloud computing environment. The management platform also manages those data objects. These managed data objects are independently associated with the managed entities. The managed entities each have an entity identification. The managed data objects or managed entities are each independently associated with one or more permissions. These permissions may be defined by a manager responsible for managed data objects or managed entities. Permissions are associated with rules definable for the managed data objects or identified managed entity. The rules may also be defined for one or more processing events performable on the managed data objects. A processing event may be, for example, accessing (e.g., downloading), creating, viewing, merging, altering, sharing, sending, copying, printing, deleting, modifying of the managed data objects, or any combination or sequence of these actions performed on the managed data objects.

The management platform receives information about the one or more processing events. This may involve extracting API information received from different application serves used by the managed entities. The management platform determines whether the managed data objects is independently associated with a persistent identifier (PID) and, if any of the managed data objects is not associated with a PID, generating a PID for each non-PID-associated managed data object. This provides the managed data objects such that they are each is independently associated with a PID. The management platform generates an information set (e.g., data graph, real-time data stream) that identifies the processing events performed on each of the PID-associated managed data objects in the cloud computing environment. This provides status information for the state of the processing events to managers, IT admins, or other operators. The management platform also compares each of the processing events with rules and generates information about whether the processing events performed on one or more of the PID-associated managed data objects is out of compliance with one or more of each of the associated rules. This may lead to the transmission of an alert to a manager.

Additional advantages of the present disclosure will be set forth in part in the description that follows, and in part will be apparent from the description, or may be learned by practice of the present disclosure. The advantages of the present disclosure will be realized and attained by means of the elements and combination particularly pointed out in the appended claims. It is to be understood that both the foregoing general description and the following detailed description are exemplary and explanatory only and are not restrictive of the present disclosure, as claimed.

BRIEF DESCRIPTION OF THE DRAWINGS

FIGS. 2A-D represent examples of portions of the functionality of a management application executed in a computing environment of FIG. 1, according to various embodiments of the present disclosure.

DETAILED DESCRIPTION OF THE INVENTION

Figure 1:
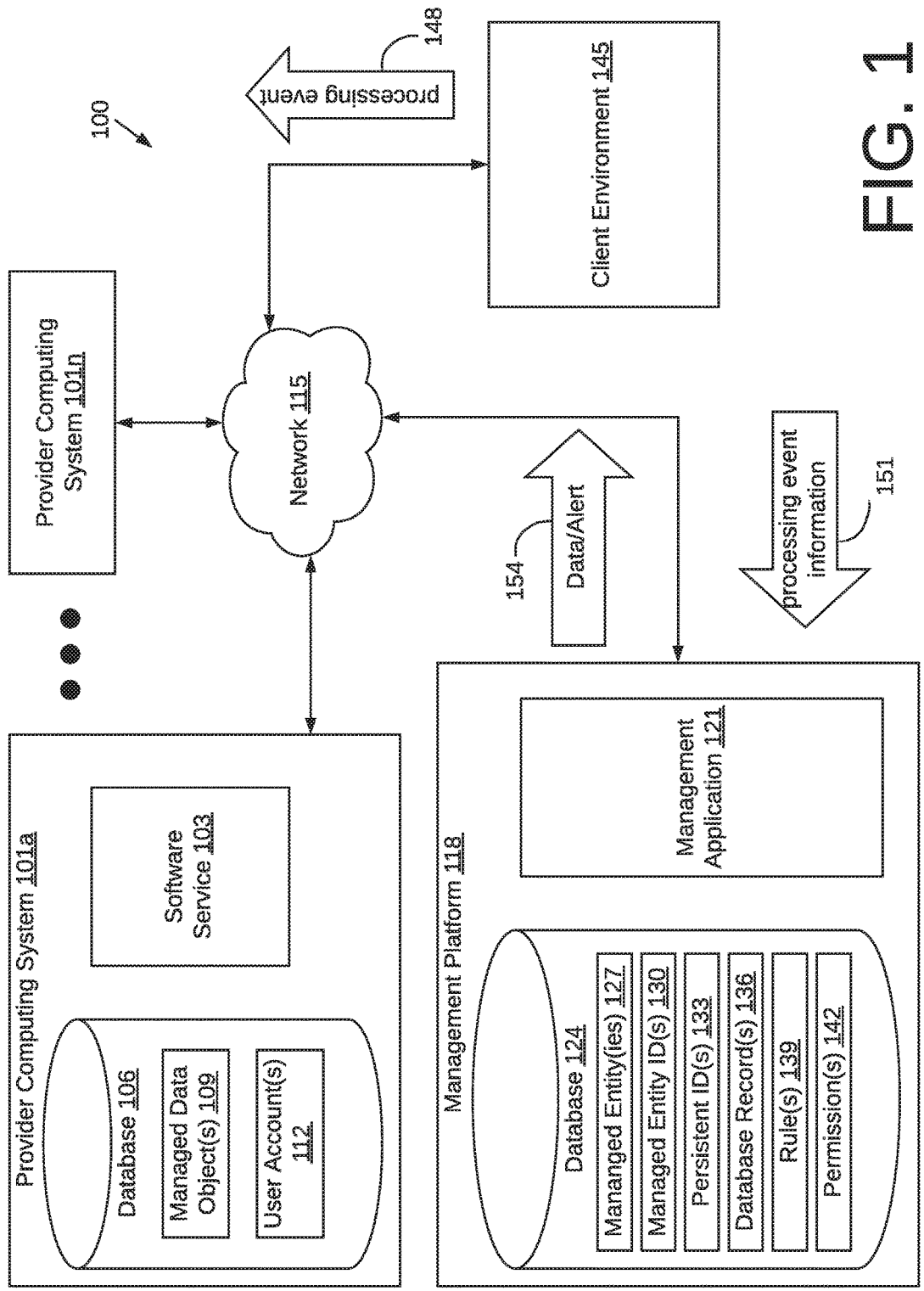
FIG. 1 is a drawing of a computing environment, according to various embodiments of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

While this disclosure provides a description of the specific implementation of cloud computing, it should be appreciated that the description herein is not limited to a cloud computing environment. Rather, aspects of the present disclosure are suitable for use with any other type of computing environment now known or later developed.

As would be recognized, "cloud computing" is a model of service delivery for enabling convenient, on-demand network access to a shared pool of configurable computing resources. In non-limiting examples, such computing resources can include one or more of: networks, network bandwidth, servers, processing, memory, storage, applications, virtual machines (VMs), and services.

A cloud computing environment is characterized by a number of features. First, a cloud services user can unilaterally provision computing capabilities, such as server time and network storage, as needed and automatically, that is, without requiring human interaction with the provider of the service being provisioned. The user can also access a network broadly, in that capabilities are available over one or more networks and can be accessed via varied and standard client platforms or devices (e.g., mobile phones, laptops, and PDAs, etc.). In a further characteristic, a service provider's computing resources will be pooled to serve multiple users in a multi-tenant model. This enables different physical and virtual resources at the provider level to be dynamically assigned and to be assigned according to user demand. Location independence is present in relation to a user's general lack of control or knowledge over the exact origin or location of the provided resources, however, a user may be able to specify location at some level of abstraction (e.g., country, state, or data center). Further, service provider capabilities can be rapidly and elastically and, in some cases, automatically, provisioned. From the user perspective, the provider's capabilities available for provisioning often appear to be unlimited and can be purchased in any quantity at any time. Cloud computing environments also allow automatic control and resource optimization by enabling metering capabilities in a context appropriate to the type of service (e.g., storage, processing, bandwidth, and active consumer accounts). Resource usage can therefore be monitored, controlled, and reported, thereby providing transparency for both the provider and consumer of the utilized service.

Cloud computing environments are associated with various categories of service, namely, Software as Service ("SaaS"), Platform as a Service ("PaaS"), and Infrastructure as a Service ("IaaS"). Each of these are discussed below.

Software as a Service ("SaaS"): the ability to utilize provider applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service ("PaaS"): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service ("IaaS"): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:
Private cloud: the cloud infrastructure is operated solely for an organization. It may be managed by the organization or a third party and may exist on-premises or off-premises.
Community cloud: the cloud infrastructure is shared by several organizations and supports a specific community that has shared concerns (e.g., mission, security requirements, policy, and compliance considerations). It may be managed by the organizations or a third party and may exist on-premises or off-premises.
Public cloud: the cloud infrastructure is made available to the general public or a large industry group and is owned by an organization selling cloud services.
Hybrid cloud: the cloud infrastructure is a composition of two or more clouds (e.g., private, community, or public) that remain unique entities but are bound together by standardized or proprietary technology that enables data and application portability (e.g., cloud bursting for load balancing between clouds).

In a first aspect, the present disclosure comprises a method of managing data objects comprising managing, in a cloud computing environment, a plurality of managed data objects. The cloud computing environment can comprise a plurality of SaaS applications, wherein at least two of the plurality of applications are heterogeneous, as such term is defined elsewhere herein. Each of the plurality of managed data objects are each, independently, correlated with one or more managed entities, as such term is defined elsewhere herein. Each managed entity has an entity identification, thereby providing a plurality of managed data objects associated with an identified managed entity. Either or both of the plurality of managed data objects or managed entities are each, independently, associated with one or more permissions definable by a manager of each of the plurality of managed data objects or each of the managed entities. The permissions are associated with one or more rules definable for either or both of the managed data objects or identified managed entity; and one or more processing events performable on the managed data objects by the identified managed entity or one more actors. In accordance with the present disclosure, at least some of the processing comprises the one or more processing events, wherein the one or more processing events comprises one or more of accessing (e.g., downloading), creating, viewing, merging, altering, sharing, sending, copying, printing, deleting, or modifying of the managed data objects, as discussed further hereinafter. The present disclosure further comprises receiving, by the computer, information about the one or more processing events, and determining, by the computer, whether each of the managed data objects is, independently, associated with a persistent identifier (PID) and, if any of the managed data objects are not associated with a PID, generating a PID for each non-PID-associated managed data object, thereby providing a plurality of managed data objects wherein each is independently associated with a PID. This PID aspect of the present disclosure is further described hereinafter. An information set identifying each of the one or more processing events performed on each of the PID-associated managed data objects in the cloud computing environment can be generated, which can allow real time (e.g., current or substantially current) information for the state of the processing events performed by the one or more actors on the PID-associated managed data objects in the cloud computing environment to be obtained. Once this information set is obtained, a comparison step is generated wherein each of the processing events performed by the one or more actors on the PID-associated managed data objects with one or more of the permissions associated with either or both of the managed data objects or the one or more identified managed entities. As a result of this comparison step, information can be generated about whether the one or more processing events performed on one or more of the PID-associated managed data objects is out-of-compliance with one or more of each of the associated permissions. In addition to generating information, the information is transmitted as a notification that indicates the non-compliance.

As used herein, data objects that can be managed, and that can conform to the definition of "managed data objects," is expansive and can include, in a non-exclusive listing: comprise at least one of: users, groups, mailboxes, files, folders, calendar events, contacts, contact information, database records, metadata, permissions, chats, messages, emails, data streams, hardware devices (e.g., desktop computers, smartphones, tablet computing devices, electronic book (e-book) readers, netbook computers, notebook computers, laptop computers, personal digital assistants (PDA)), vehicles, policies, phone numbers (e.g., numbers assigned to multiple endpoints like mobile applications, IP desk phones, and/or softphones that are included off an interactive voice response [IR/call tree] etc.), IP addresses, cloud computing projects, collaboration projects, and unique object/device identifiers. In further, non-limiting examples, the managed data objects can include one or more of entry fobs/cards, cloud hosting projects (e.g., Amazon EC2 projects, Google Cloud Platform projects, etc.), social media posts on an organization's behalf, third-party applications that have been installed from app marketplaces and authorized by users, policies, logs, permissions, computing devices (smartphones, web-enabled televisions, video game consoles, set top boxes (STB), digital video recorder (DVR) systems, wearable user devices etc.), sensors or collection of mechanical or environmental sensors (e.g., thermometers, pressure sensors, vibration sensors, odometers, accelerometers, ammeters, voltmeters, power meters, GPS locators etc.), vehicles (e.g., automobiles, trucks, planes, drones, e-scooters, bicycles, etc.), medical devices or instrumentation, machines or equipment (e.g., HVAC systems, refrigeration equipment, appliances, elevators/escalators, etc.), among other things. As would be appreciated, the managed data object can also comprise devices, sensors, or any type of electronic componentry (collectively "device componentry") that are networked in a dynamic "Internet of Things," ("IoT") wherein each of the networked device componentry are, independently, associated with at least one SaaS application that is in operational engagement with a cloud computing system in a networked environment.

In significant aspects, the data objects are "managed," in that there is a desire or obligation by an owner, manager, and/or regulator to track and, in some aspects, to be able to audit actions taken on each of the managed data objects in the cloud computing environment and by whom or what such actions were taken. In some aspects, the managed data objects comprise, includes, or is associated with at least some regulated, sensitive or compliance-related information, that is, information that is: 1) proprietary such that it the generates one or more competitive advantages for the owner as long as it is kept confidential or access is restricted or that should otherwise be kept secret/unavailable to competitors or the public; 2) that is subject to legal restrictions as to access or distribution as defined by one or more laws and/or regulations (e.g., Healthcare Information Privacy and Portability Act "HIPPA," Sarbanes Oxley, state and federal privacy laws, banking regulations, Uniform Trade Secrets Act "UTSA", Defend Trade Secrets Act "DTSA," General Data Protection Regulation "GDPR," etc.); 3) that is subject to a legal obligation to maintain confidential as set out in a contract, agreement or the like; 4) for which it is otherwise desirable to limit access to the information therein (e.g., personal information) at least because consumers may not appreciate that third parties may gain access to their information may release it to third parties without their express approval, even when they have given access to a first party to such information.

A "managed entity" can be anything that has or can have access to a managed data object. In short, it can be anything that a manager (which can be a human or a computer or both) has the ability to track, control, etc. their actions in a cloud computing environment, such as to directly grant or revoke access to managed data objects, programs, systems, etc. A "managed entity" can be, for example, an employee or a group of employees (e.g., a department), or a group of users that can be managed by an administrator (e.g., shared membership in a controlled access environment). Still further, a "managed entity" can comprise a hardware device (e.g., computer, smartphone, IoT device), vehicle, access card/fob, among other things.

An "actor" can include anyone or anything that, in the cloud computing environment, may perform various processing events on, or be involved in various processing events, that may of interest. For example, processing events that allow third parties to gain access to a managed data object would be of interest for tracking, monitoring, auditing etc. if that managed data object is subject to regulation, or is proprietary, sensitive or compliance-related. In some aspects, the actor can be managed entity, such as when a person who shares a managed data object is an employee of a company that owns or is responsible for the managed data object. Access to the managed data object can be deprovisioned by removing a permission to access the managed data object by an administrator when the actor is a managed entity. However, in some aspects, the actor can be a third party to whom the administrator has no direct ability to control access to the managed data object, such as when the third party is someone with whom an employee shares the managed data object, and the third party is not an employee or otherwise under administrative control of the company, for example. Other possible scenarios are detailed hereinafter.

In a significant aspect, the methods herein can address the technical problem of monitoring, tracking, managing, auditing etc. the processing of managed data objects in and among a plurality of SaaS applications in a cloud computing environment, wherein at least two of the applications are heterogeneous. As used herein, "heterogeneous" means different applications that are produced, created, developed etc. by different providers/vendors, different application instances from the same providers/vendors, and/or that are further customized application instances of the same provider/vendors. For example, Google and Salesforce are "heterogeneous" SaaS applications because they are from different providers/vendors. However, two Salesforce implementations within a single company but in different departments can also be "heterogeneous" because they may incorporate customizations for each respective department. As discussed previously, the flexibility provided by SaaS applications, and the attendant loss of IT administrator control of implementation within or among organizations can frequently give rise to the inability of the administrative functions to readily manage IT in the cloud computing environment. In one aspect, "heterogeneous" means at that there exists at least the possibility that at least one SaaS application operational in a cloud computing environment is functionally capable of de-correlating a managed data object from a managed entity prior to the association of that managed data object with a PID, as is discussed in more detail hereinafter.

An organization that implements the systems and methods of the present disclosure can, in significant aspects, incorporate an almost unlimited variety of SaaS applications within a network computing environment substantially without reducing or eliminating the ability track the flow of and use of managed data objects between and among such applications by both internal and external users, devices, etc.

In some implementations, a managed data object can also be a managed entity, depending on context. For example, a medical device can incorporate protected health information thereon. In some contexts, the medical device is a managed entity and the protected health information is the managed data object. In other contexts, the medical device itself can be the managed data object, and the managed entity can be a person who is responsible for managing the medical device, such as an employee. A key fob granting entry to a location can be a managed entity and the data associated with such entry can be the managed data object, or the key fob can be the managed data object, and the managed data entity can be the person who is responsible for the managed data object.

A variety of processing events are potentially relevant to tracking the managed data objects in the cloud computing environment. These can include, for example, accessing, creating, viewing, merging, altering, sharing, sending, copying, printing, deleting, or modifying the managed data objects. Permissions and rules associated with the managed data objects and/or managed entities can be generated, as is set out in more detail hereinafter.

"Suspicious" processing events can also be tracked, monitored, audited, etc. As used herein, "suspicious events" include, in non-limiting examples, events relating to managed data objects, for example data objects that have been deemed as being of interest. In this regard, the present disclosure can comprise selecting for tracking one or more managed data objects and one or more events associated with that managed data object, and tracking that selected managed data object(s) and the selected event(s) performed on that managed data object(s) in the cloud computing environment. In non-limiting examples, the following can be tracked for the selected managed data object(s) in the cloud computing environment: downloading, file sharing, mass file sharing, mass file downloading, email forwarding, account transferring, delegation access granted, file downloading, file sharing, mass file sharing, mass file downloading, email forwarding, account transferring, delegation access granted, consecutive login failures, logging in from multiple locations, logging in from a suspicious location, accessing files from suspicious (e.g., unknown, unauthorized, etc.) locations, downloading files from a suspicious locations, group access settings changed, user permissions changed, 2 factor disabled, admin downgraded, admin deleted, granting application/token access, connecting mobile devices, devices compromised, and lost devices, among other things.

Such tracking, monitoring, auditing, etc. is possible even though one or more of the SaaS applications operational in the cloud computing environment may include programming features that operationally may remove, modify, delete, or otherwise transform the correlation between the managed entity and the managed data object during processing thereof. For example, a SaaS application may remove a correlation between a managed entity who is an employee and a file that is a managed data object when that file is processed by the first SaaS application. When information about that processing event and file are received, the absence of the expected correlation can reduce the ability of a system to track, monitor, audit, etc. the processing events performed on that file in the cloud computing environment. In this regard, the presence of at least one heterogeneous SaaS application in the cloud computing environment can give rise to a reduced ability to automatically analyze processing events performed on the managed data objects, at least because, after processing, a managed data object may no longer incorporate expected identity information.

During processing of a managed data object to provide the desired user functionality with which that managed data object is associated, one or more of a plurality of SaaS applications operating in the network computing environment may, at the level of each respective SaaS application, independently, modify, remove, or replace the correlation between a managed data object and a managed entity to result in de-correlation thereof. For example, if the managed data object was correlated with the managed entity johnmsmith@smithco.com when the managed data object was created, and during operations in SaaS applications, the managed data object correlation is removed, modified, or replaced by an application, the managed data object will no longer possess the assigned managed data object entity correlation characteristics. It may then become difficult, if not impossible, for an IT administrator, such as via a network computing module that processes the managed data object, to accurately monitor, track, manage, audit etc. actions that were taken on that managed data object among a plurality of SaaS applications in a network computing environment.

Modification, removal, or replacement of the correlated, or expected, managed data object identification can result from the specific operational aspects of a SaaS application operating in the cloud computing environment. As discussed previously, no standardization of API configurations exists. While recommendations exist as to how to generate API's exist within various operational frameworks (RESTful, SOAP etc.), variations in programming can exist even within these frameworks. Indeed, considerable latitude is usually given to developers when generating a desired functionality using programming language. Moreover, many SaaS applications today may be formulated in a "quick and dirty" fashion in which an API is not generated with a goal to enhance interoperability with other SaaS applications but, rather, are initially intended as a stand-alone product with a specifically defined or special purpose functionality. When such a SaaS application is later integrated with other applications to generate a plurality of SaaS applications operational together in a network computing environment, these one or more applications may modify, remove, or replace the association between a managed data object and managed entity.

The increasing "sprawl" associated with SaaS applications also contributes to the likelihood of different identities being ascribed to a single managed data object, at least because as more APIs become operational with the same managed data object, the more likely it is that the managed data object correlations may begin to deviate from an assigned/expected value at some time during the lifecycle of the managed data object in a cloud computing environment. Such deviation can reduce, or even prevent, the ability for an IT administrator to automatically monitor, manage audit etc. actions taken at the SaaS applications level for that same managed data object since the same managed data object can be associated with two or more managed data object identifiers after processing thereof in the cloud computing environment.

In an implementation, the systems and methods herein pertain to the monitoring, tracking, managing, auditing etc. of one or more managed data objects that is or has been in operational engagement with a plurality of SaaS applications, that is, subject to one or more processing events. Notification of such operational engagement is indicated by receiving of information pertaining to one or more processing events. As would be appreciated, such received information represents specific actions or operations that a SaaS application can invoke at runtime to perform tasks, for example: in relation to data querying, accessing, adding, modifying, updating, deleting, modifying, sharing, printing, etc. Logins, adding of users or groups, acquiring SaaS applications, and other events can also be associated with received processing event information. The processing event information may be associated with a web-based system, an operating system, a database system, computer hardware, device hardware, or a software library.

As would be appreciated, SaaS applications can leverage existing managed data objects owned or managed by a party—such as a company that creates, owns, administers, manages etc. the managed data object—to provide functionality that is demanded by users. Increasingly, SaaS applications are generated to provide limited and self-contained functionality that can be combined with other SaaS applications on an as-needed basis to allow users to define and orchestrate their own experiences, as opposed to having to purchase software platforms that may provide comprehensive "one size fits all" functionality.

In this regard, the present disclosure incorporates functionality that enables interoperability between such plurality of SaaS applications by substantially ensuring that a single managed data object correlation with a managed entity will be maintained in a persistent fashion independently of how the managed data object may be processed in the cloud computing environment. In particular, the methodology herein is configurable to determine whether a managed data object processed in a cloud computing environment has been assigned a persistent identity. If a persistent identity is found not to be associated with the managed data object, processing can allow the identity of the managed to be determined, such as by processing of one or more of the data object metadata, SaaS application metadata or the managed data objects.

In one aspect, the present disclosure allows the normalization of managed data object identities and correlation thereof with one or more managed entities across a plurality of SaaS applications to enhance interoperability of the plurality of data SaaS applications in relation to managed data objects moving in and among those applications. The type of SaaS applications in the plurality of applications can be highly varied. "Interoperability" can be defined as a measure of the degree to which diverse systems or components can work together successfully. A more formal framework is the ability of two or more systems or applications to exchange information and mutually use the information that has been exchanged. "Syntactic interoperability" relies on specified data formats, communication protocols, and the like to ensure communication and data exchange between at least two systems, be they platforms, devices, programs, files, or the like (collectively "systems"). For syntactic interoperability, the exchanged information can be processed, but there is no guarantee that the interpretation is the same. "Semantic interoperability," on the other hand, exists when the at least two systems have the ability to automatically interpret exchanged information meaningfully and accurately in order to produce useful results via deference to a common information exchange reference model. The content of the information exchange requests is unambiguously defined: what is sent is the same as what is understood.

To this end, and as would be appreciated, between and among a plurality of SaaS application a single managed data object may be processed in varied manners to result in the generation of a plurality of connected managed data objects. To illustrate: files stored in file storage services can differ from those in chat applications, which can differ from those in CRM applications. The same managed data can be stored in different places when functional within a plurality of SaaS applications, and each application can have its own set of APIs for accessing that data programmatically. Each application can have different access, permissions, and sharing models as well. Thus, for an IT department to be able successfully manage data objects within an organization's cloud computing environment, the plurality of connected managed data objects (e.g., audit logs, calendars, files, metadata, groups, users (including external users, tickets etc.)), must be ingested and normalized across a plurality SaaS applications, some or all of which may be heterogeneous.

In use, a managed data object identification may be modified, removed, or replaced in conjunction with a processing event for many reasons, or even for no reason. In a SaaS application environment such actions are operational at the level of each SaaS applications. As such, any actions on the managed data object will typically be outside of the ability of the managed data object owner or manager's ability to control. This is in contrast to the situation that existed in the past, where a centralized point of administration existed for network computing environments. In many situations in today's cloud computing environments, the actions made on managed data objects therefore will not be visible to the data owner or manager in real time, or even at all at least because there is no centralized point of control.

When processing event information is received by a network computing module with a report that the managed data object was subjected to a processing event in conjunction with a SaaS application, the module can be operational to determine whether there is a persistent identifier ("PID") associated with the managed data object. If there is no PID associated with the managed data object, one can be assigned. Once made persistent, the managed data object having an associated PID will remain consistently identifiable in subsequent SaaS applications operations. An "expected value" for a managed data object identity can vary according to the implementation, where an expected value is an identifier that has previously been assigned to the managed data object or has otherwise been matched to or associated with the managed data object. In non-limiting examples, an expected value can comprise an email address, owner's name, employee ID number, social security number, telephone number, barcode, QR code, IP address, device ID, or the like.

By association of a PID to a managed data object, a standardized and unmodifiable data object identity can be associated with each managed data object. The PID will therefore remain the same even though a SaaS application may, in a future processing event, modify, remove etc. the entity identification for that managed data object. The PID can be incorporated in metadata associated with the managed data object. To this end, the managed data object is assigned a PID that will remain the same regardless of where the managed data object is located, how it is processed, or how it is stored. The association of a PID to a managed data object thus facilitates the ability to keep track of processing events performed on the managed data object. The association of a PID therefore provides the capability to unambiguously identify such managed data objects irrespective of the actions taken thereon by remotely operated SaaS applications. Such PIDs can be maintained through the lifecycle of a respective managed data object to allow the object to be identified consistently and permanently.

In further aspects, a network computing module is configurable to process a managed data object having a data object identity that does not conform to an expected value by evaluating information associated therewith, such as metadata. For example, if an expected value for a data object identity is an email address, such as johnmsmith@smithco.com, and a data object's metadata after processing in a SaaS application does not incorporate such an email address (e.g., the email address was modified, removed, or replaced by the application), the managed data object will not have an expected data object identity. In such a case, the managed data object can be processed to extract or otherwise provide information that can be used to substantially, and accurately assign an identity to that managed data object, followed by generation of a PID for that managed data object.

For example, if a data object identity does not conform to the johnmsmith@smithco.com expected data object identity, the network computing module can process the object's metadata, SaaS application metadata, and the managed data objects themselves to generate an accurate identification of the managed data object so as to appropriately associate the managed data object with a managed entity. As a non-limiting example, the managed data object metadata may include some form of identifier such as one or more of a user's name, personally-identifiable information that links the managed data object to a managed entity (e.g., Social Security number, unique user identification number, payment card information, phone number, or the like), location (home address, GPS coordinates etc.) or other information that can be reliably inferred to enable a matching of the managed data object with a managed entity that is, or should be correlated, to that object (e.g., person, group, organization etc.) or any other unique identifying information that can be used to correlate a managed entity to that managed data object. A managed entity can be "associated" with a managed data object via a record of actions taken thereon by the managed entity where the record is obtainable for use. For example, the managed entity could have created, accessed, viewed, printed, modified, shares, etc. the data object in conjunction with the entity's roles and responsibilities in the organization. Information about such association can be generated, at least in part, from the data object of interest's metadata. For example, if "Bob" is an employee of an organization, and Bob creates, accesses, views, prints, modifies, shares, etc. a data object that is managed by the organization (e.g., the data object comprises sensitive, regulated, or compliance-related material), the data object's metadata will incorporate information that associates Bob with the managed data object. Subsequent programming events performed on that managed data object, either by "Bob" as the managed entity or by a third-party actor who is not a managed entity, can then be monitored, tracked, audited, etc. according to the disclosure herein.

While the PID can allow a managed data object to be durably associated with the managed entity for use in subsequent processing events, in some aspects, a second, or global identity, can be assigned to the PID-associated managed data object. For example, if "bob@smithco.com" is the PID-association generated after processing of the managed data object, a separate identification can be assigned to the PID-associated managed data object such as "confirmed identity=bob employee at smithco, id #12345." Such a "global identity" can allow confirmation for an administrator that the identity of the managed data object has, in fact, been processed to generate an actual, and correct, association with the managed entity. In other words, the "global identity" can serve as validation that the processing according to the present disclosure has been conducted, and that information generated about such processing a cloud computing environment is accurate.

The step of correlating a managed data object with a managed entity can optionally provide a probability that the managed data object has been accurately identified and correlated. If the probability is below a certain level, for example, below about 0.99 or below about 0.95, or below about 0.90, an indication and optional notification can be generated that an inaccurate managed data object/managed entity correlation may have been generated. In such a case, a report etc. can be generated to allow monitoring, managing, auditing etc. of potentially inaccurate correlation of managed data objects with managed entities. For example, a probability that the generated global identity is correct (or incorrect) can be provided. Still further, a human operator can be prompted to review such potentially inaccurate generated managed data object/managed entity correlations for correction thereof or other suitable operations that can be affected on such managed data objects. In some aspects, machine learning and training sets can be incorporated to improve the operation of the managed data object identity normalization step over time.

When a processing event (e.g., accessing, sharing, copying, printing, modification, etc.) is performed on a managed data object by a SaaS application, such action will be visible after the fact via received information about such events. Such processing events can be compared with one or more rules associated with the managed data object and/or the managed entity to determine whether the processing event performed on that managed data object is compliant with the one or more rules associated with that object. In accordance with the improvements in confirming each managed data object identity and by making each persistent, an IT administrator can be sure that the reports on managed data objects are complete and correct.

To this end, the manager of a managed data object and/or a managed entity—that is, an IT administrator or an IT department of an organization or among a collection of users etc.—will often be interested in or legally required to monitor, track, audit etc. processing events performed on a managed data object and/or that were performed by the managed entity, and that might be taken in the future. Such processing events can be associated with rules that govern or are associated with the managed data objects and/or the managed entity. If such processing events are shown to be out-of-compliance with one or more rules, information can be generated therefore. Such information can be provided via a notification to one or more of the managed, the actor, the system administrator, or a database record.

In accordance with the rules associated with the managed data objects and/or the managed entities, the present disclosure further comprises comparing a processing event performed on a managed data object having a PID associated therewith to determine whether the event complies with one or more rules associated with that managed data object and/or the managed entity. A rule can be specifically defined for the managed data object, the managed entity or the rule can be defined for a user or group of users, or otherwise. Rules can be generated by the organization internally, or by an external standards organization, or by a governmental agency via regulation.

Such rules can be fully or partially generated at the network level. For example, a user or a manager of the network can actively define and set rules from a dashboard or the like. Alternatively, a rules engine can apply rules that have been defined. In this regard, instead of being presented to a manager for action thereon, the rules can be automatically defined and managed data object and/or managed entity actions at the SaaS applications level can be automatically processed to assess compliance with one or more rules and, optionally, for action thereon. Such automated compliance modules are an emerging business model in the cloud computing ecosystem and are generally referred to a "compliance as a service" ("CaaS"). One example of a methodology that can be used in a CaaS implementation is disclosed in U.S. Patent Publication No. US20160080422, the disclosure of which is incorporated herein in its entirety.

Any processing events performed on managed data objects (e.g., sharing, editing, copying, printing etc.) or by managed entities that are reported to the system could be determined to be out-of-compliance with a defined rule. If such non-compliant events are indicated to have occurred by comparison of the event with a defined rule for that managed data object (or class/type of managed data object) and/or managed entity (or class/type of managed entity), an out-of-compliance notification can automatically be generated. In some aspects, an out-of-compliance notification may be processed automatically to generate a notification to a managed data object owner/manager, the managed entity, a third-party actor, or for storing in a database record, such as for use in a developing an audit trail. Still further, such automated processing many not generate a notification. Such automatic notifications (or absence thereof) can be generated (or not generated) in accordance with existing management of and/or filtering of notifications as described in U.S. Pat. Nos. 9,348,687 and 9,521,035, for example, the disclosures of which are incorporated herein in their entireties by this reference.

In accordance with a compliance module, a managed data object and/or a managed entity can have a rule associated with the type or class of managed data object and/or managed entity. For example, a managed data object can be classified as "proprietary," such as would be appropriate for trade secret or confidential information. Such information may be subject to one or more rules that are intended restrict access to that information to persons in and among an organization, where such persons may be associated with a particular department, position, or the like. In some circumstances, such proprietary information may be accessible to persons external to the organization, such as freelancers, consultants, contractors, or service providers. If processing event information is received about a managed data object (e.g., accessing, sharing, copying, modifying, printing, etc.), such processing event can be compared to a rule that is associated with that specific managed data object, type of object, or data object classification to determine whether that processing event is in compliance with that policy.

In further aspects, the rules associated with a managed data object and/or managed entity can be selectively definable for a plurality of managed data objects and/or managed entities and/or third-party actors. The rules associated with the managed data objects, managed entities and/or third-party actors can vary as a function of the object and the party. In other words, the rules are manageable and applicable based on context.

To this end, the compliance-related notifications can be automatically processed to determine whether they should be acted on in context. The sharing of a managed data object may be out-of-compliance with a generated rule, but may not require action thereon in a particular situation. A type of managed data object, for example a protected health record, may be subject to a non-sharing outside of the company policy. As such, an attempt to share that file may generate an out-of-compliance notification as a matter of rule. However, if the person to whom that managed data object is being shared is, in context, an appropriate recipient of the data, the out-of-compliance indication can optionally not be presented as a notification to a user. In this example, if a contractor, consultant, freelancer etc. is associated with a company project, department, employee, etc. and that association indicates that sharing of the managed data object is appropriate in context, the out-of-compliance notification need not be made even though an indication that the processing event might have been out-of-compliance may have been generated.

Yet further, a class of managed entities and/or actors can be associated with rules. In this regard, a rule can be generated that the CFO can share any managed data object that incorporates SEC-regulated financial information unless the time period at the time of sharing is in a mandated "Quiet Period." Or, a rule can provide that the CFO can access any files from any location unless there is a signal of a suspicious login, such as multiple login attempts prior to a successful login event. Yet further, a CFO could be able to access and perform any processing events on managed data objects, but the CFO's direct report could be limited in the number of files that she could download in one login. Still further, any financial files shared outside the organization (for example to a third party who is not a managed entity) can be associated with a rule that provides a notification of when the file is shared, downloaded, copied, etc.

In some aspects, an out-of-compliance notification can be stored in a database record for reporting to a relevant department or government agency or to create an audit trail. Still further, such out-of-compliance can trigger a notification to an IT (information technology) administrator who can optionally act thereon. Yet further, such out-of-compliance with an applicable rule can trigger a notification of a relevant user, group, etc. This relevant user, group, etc. can be an identified user, group, etc. associated with a processing event the managed data that triggered the out-of-compliance notification. For example, if an identified user is an employee or otherwise within the management purview of the organization (e.g., a freelancer or consultant) or who is member of a group that owns or manages that managed data object, a message can be sent to the user that her action was out-of-compliance with a rule associated with that managed data object. The user or group of users can be sent a message via email, text, app, etc. along the lines of: "You recently shared [this file, calendar, etc.]. This action is not in compliance with corporate [or group etc.] policy. Please ask the recipient to delete the file and refrain from doing so again." If the user who performed an out-of-compliance processing event on the managed data object is not under the management purview of the administrator, for example, is a third-party actor, the message generated could be formulated to notify that actor of a legal obligation existing as to that managed data object that might subject that actor to legal liability for unauthorized activities involving that managed data object. Still further, a managed entity could be instructed to notify the external user of the out-of-compliance activity and request that the managed data object be deleted, returned, etc.

If an out-of-compliance notification is generated for a managed data object, one or more permissions associated with the managed data object, the managed entity and/or third-party actors can be modified in relation to that managed data object. Such permission modification can be automatically generated by the system (for example by the compliance module), by an IT administrator, or both. As would be appreciated, a number of permissions can exist for each managed data object, managed entity and/or third-party actors. In non-limiting examples, these can include: accessing, creating, viewing, merging, altering, sharing, sending, copying, printing, deleting, or modifying of the managed data objects. If a managed data object is shared improperly by one or more users, groups, etc. such that an out-of-compliance notification is generated, that user's or group's permissions can be modified to reduce or eliminate the occurrence of such out-of-compliance actions in the future. For example, a user's permissions can be changed from "read, write, share, print" to only "read, write only" or "read only."

Notably, out-of-compliance processing events performed on a managed data object by a user may be inadvertent. As a managed data object moves between and among various SaaS applications, the individual applications can assign their own set of permissions to a managed data object, as discussed previously. For example, the owner or manager of a managed data object may have assigned a policy of "no print" to the managed data object, whereas a user of that managed data object in the cloud computing environment may have "SuperAdmin" permissions in the SaaS applications in which the managed data object is operational. In this regard, the SaaS applications would place no restrictions on the user's printing of the managed data object which would, of course, be in violation of the "no print" rule placed on the object by the managed data object owner or manager. The functionality of the present disclosure can enable the managed data object owner or manager at least visibility to actions that affect access to a managed data object, even where the managed data object owner or manager may not have the ability to preempt such actions because they are occurring at the level of the SaaS application. Such visibility can be critical in for managed data objects that comprise sensitive, regulated, or compliance-related managed data object: the requirement to protect such managed data objects from unauthorized access or disclosure exists even when it is difficult, if not impossible, to physically stop such disclosures in the first place. To this end, by providing the owner or manager of these managed data objects with timely notifications that of out-of-compliance processing events have occurred, any damage from unauthorized access or disclosure can be mitigated, such as by notifying relevant users before the object is disclosed more broadly.

Further, timely out-of-compliance notifications can allow the owner or manager of the managed data object to act on the user (e.g., managed entity, third party actor) whose activity on the object was out-of-compliance. For example, if a minimal "data leak" resulting from an unauthorized sharing of a managed data object can be identified before substantial damage occurs, further data leaks can be reduced or even prevented, such as by notifying the user or by revoking the user's sharing permissions etc.

Notably, the definition of "timely" in regard to out-of-compliance notifications depends on the context of the information and the situations. For example, improper disclosure of protected health information gives rise to liability immediately, even though that disclosure may not have resulted in a third-party's gaining access to that information. Thus, a "timely" notification of the disclosure of protected health information will ideally be immediate or substantially immediate or at least as soon as possible. On the other hand, data leaks are often not recognized for some period of time by either the owner or a third party. Damage from that such leakage is therefore minimal since the data is not being accessed. If a third party does not access that information, a timely notification may be commensurate with any period of time prior to the access of a third party to that information, be it days, weeks, or months etc.

In a further aspect, processing events performed a managed data object at the level of a SaaS application irrespective of the type or vendor of the SaaS applications can be monitored, tracked, managed, audited etc. In other words, the present disclosure can provide heretofore unavailable systems and methods to allow global monitoring and tracking of actions taken on managed data objects that are operational in a plurality of SaaS applications. This can allow an organization to reduce or substantially eliminate liability resulting from inadvertent disclosure etc.

In a significant implementation, the systems and methods can provide centralization of a plurality of SaaS applications operational in a cloud computing environment. "Centralization" refers to the state of having a comprehensive consolidated view of managed data objects and the actions taken thereon that may be operational across one or multiple SaaS applications in one place, such as via a dashboard. The entire framework can be associated with centralization of a plurality of managed data objects connected across applications. Significantly, the centralization provided by the present disclosure can allow not only visibility to users outside of the organization, but can also provide information about the actions these external users are taking on the managed data objects.

In regards to such centralization, an information set can be generated that can be provided in the form of a data graph that is viewable on a monitor, printable from a device, or otherwise recordable in a database. Processing events taken on the managed data objects can also be incorporated in the information set and, optionally, viewed, printed, or recorded in a database record.

The methods and systems disclosed herein can be used in a network computing environment to allow a unified dashboard to be generated to monitor, track, manage, audit, etc. processing events performed on managed data objects within and among a plurality of SaaS applications by managed entities and/or third-party actors. In this regard, the systems and methods of the present disclosure can allow the owner or manager of managed data objects to centralize control of, orchestrate complex actions upon, and/or delegate administrator permissions with respect to such managed data objects across a plurality of SaaS applications. Still further, the present disclosure allows contextualized event logs to be generated across a plurality of SaaS applications, where such event logs are viewable in the unified view.

In non-limiting examples, the following may be manageable (e.g., visualizable, actionable, etc.) from a centralized location, such as a dashboard, even though the managed data objects relevant to such processing event may have been processed by a plurality of SaaS applications:

Which third-party applications have access to the organization's managed data objects?
What kind of access do they have?
What kind of administrative permissions do employees have across SaaS applications?
What is each user and/or administrator doing in each SaaS application?
What kind of member access, sharing options, and settings do the organization's groups have (e.g., who can view the group, members, and member email addresses; who can add/remove people; who can post topics, etc.)?
How many managed data objects (e.g., files, calendars, etc.) are publicly shared?
Who has super admin access, either for a single SaaS application or multiple applications?
What are all the pages that exist on the domain (e.g., a company intranet, client project sites)?
What automations/workflows are set up in a single SaaS application or across multiple applications?
How can IT view contextualized event logs across SaaS applications?
Login information (e.g., location, date, time)
Email signature compliance In an implementation of this aspect of the present disclosure, onboarding, offboarding, information security, system maintenance, operational efficiency for users, groups, etc. can be facilitated with the present disclosure.

"Onboarding" means the introduction of a user, group, etc. to an IT environment, such as when a person is hired as a new employee, a freelancer or consultant is engaged to assist in a project, or an employee is moved to a new position or department. In other words, onboarding is the process of equipping new users, groups, etc. with the proper tools needed to complete tasks associated with such users, groups, etc. This can include, for example, provisioning new accounts, providing users with access to managed data objects such as shared files and folders, adding them to the right groups, applying email signatures that comply with organizational standards, etc. There are various analogs of onboarding, where key aspects of this activity include introducing a new user to an IT environment, granting permissions to that user as to access a collection of managed data objects, and defining rules related to the processing events that a managed entity (e.g., an employee) can perform on such managed data objects. In accordance with implementations, onboarding of a user, group, etc. to an IT environment comprising a plurality of SaaS applications can be substantially automated with the systems and methods described herein. Such automation is enabled, at least in part, due to the centralized management processes provided herein.

"Offboarding" means the removal of a user, group, etc. from an IT environment or part of an IT environment, such as when a person is removed as an employee, a freelancer or consultant is disengaged from assisting in a project, or an employee is moved to a new position or department where permissions related to previously accessible managed data objects need to be modified. Offboarding is the counterpart of onboarding. An offboarding process can comprise, for example, steps of deprovisioning a managed entity's (e.g., employee) accounts, changing passwords, transferring managed data objects (e.g., files, devices, etc.) ownership, delegating mailboxes, etc. There are various analogs of "offboarding," where key aspects of this activity include removing an existing user from an IT environment or part of an IT environment, removing permissions assigned to that user as to access to managed data objects, and defining rules related to the processing events that can be taken on such managed data objects. In accordance with implementations, offboarding of a user, group, etc. from an IT environment comprising a plurality of SaaS applications can be substantially automated with the systems and methods of the present disclosure.

"Information security" means the task of preventing unauthorized access, use, disclosure, disruption, modification, copying, or deletion to or of information that is relevant to the operations of an organization. The systems and methods of the present disclosure facilitate the use of a plurality of SaaS applications in a cloud computing environment by allowing managed data objects to move appropriately between and among a plurality of SaaS applications and within and through managed entities and/or third-party actors so as to enhance user productivity and to allow effective collaboration, while at the same time allowing the owner or manager of such managed data objects to implement and monitor the implementation of rules to make sure that the security of such managed data objects is not compromised. Specifically, the systems and methods of the present disclosure can affect data loss protection ("DLP") in a cloud computing environment by implementation of either or both of a content discovery policy or a sharing policy.

A content discovery policy allows managed data objects to be identified according to a selected category, type etc. so as to allow movement thereof to be monitored through a computing network. Content discovery policies may seek to identify manageable information that should be prevented from unauthorized disclosure or use (e.g., such as Social Security numbers, credit card numbers, bank account numbers and personally identifiable information) that should may travel through and among a plurality of SaaS applications and that, in some circumstances, may be undesirable to store in such applications. By facilitating DLP for such managed data objects, damage to the organization that will result from data loss (e.g., reputation, revenue loss, fines, customer trust, reputational effects, etc.) can be reduced or even substantially prevented.

In some aspects, a managed data object can be reviewed by the system automatically at the network computing module level, for example, such that a content discovery policy can be implemented, to determine whether the managed data object includes sensitive or compliance-related data. For example, a file, calendar, device etc. can be automatically reviewable to determine whether any personally identifiable information is associated therewith. In accordance with the managed data object aspects, the assignment of a PID to a managed data object can enhance the effectiveness of a content discovery policy at least because the identity of the managed data object can be automatically processed even if the data object identity has been modified/de-correlated from a managed entity at the SaaS application level.

Sharing options associated with SaaS applications are a "feature" for users in that users, groups, etc. can share documents, spreadsheets, presentations, calendars, etc. with specific persons, anyone in an organization, or even publicly, allowing others to read, comment, and/or edit the shared item. For IT administrators, these sharing options are often a "bug." For example, some SaaS applications, such as Slack, set the sharing settings automatically to "public," thus users of Slack may inadvertently allow sensitive or compliance-related managed data objects (e.g., files, calendars, etc.) processed in that application to be viewed without restriction if he does not first set the Slack sharing setting to "private." As would be appreciated, public sharing of managed data objects can cause significant damage to an organization because anyone within the organization or even on the whole internet can locate and access them. Moreover, the proliferation of SaaS applications where the sharing settings are defined by an entity who has no concerns about how a user's data is shared or maintained makes it more likely that sensitive or compliance-related managed data objects may inadvertently be publicly shared as a result of SaaS applications usage, especially given the propensity of software developers to prefer open access to information on the internet. Indeed, some software developers may not even recognize the need to protect managed data objects that use their SaaS applications because protection of data is typically an organizational function, not that of an individual. Because SaaS applications are typically acquired at the user level, it follows that these applications can comprise a significant "security hole" in corporate data protection operations.

The present disclosure allows sharing settings for SaaS applications in which managed data objects are processed to be reviewed by an IT administrator at the network operational level so as to allow identification any sharing settings on SaaS applications that could result in data loss. Such viewing is possible even though the IT administrator may not possess the ability to change such settings. In this regard, the methods herein allow managed data objects associated with SaaS applications that incorporate public sharing settings to be visible from a dashboard environment, for example. Still further, for managed data objects that are identifiable as incorporating sensitive, regulated, or compliance-related data therein (e.g., when a content discovery module is present), automatic notification of the managed entity correlated with that managed data object or a relevant third-party actor of such out-of-compliance sharing settings can be provided. Yet further, a report and/or an audit can be conducted automatically according to the present disclosure. In some implementations, out-of-compliance sharing may be acted on by either or both of a computer or a user (e.g., an IT administrator).

Yet further, the systems and methods of the present disclosure can allow administrative rule applications to be tracked, managed, audited etc. by giving visibility to the processing events performed on a selection of managed data objects. In this regard, actions that are taken on a selected and managed data object can allow the permissions associated with a SaaS application to be inferred, even though they might not be actually viewable at the network administrator level. As can be appreciated, it can be beneficial to reduce the number of permissions associated with a user, group, etc. In this regard, some SaaS applications, especially those that may be less mature in development form, may offer only binary administrator options: super admin or end user, with nothing in between. Accordingly, users who only need a few permissions may nonetheless be designated as "super admins." "Super admins" are users who have full access to all system administrative controls and features in SaaS applications. They have the highest level of permissions, and can therefore manage all aspects of a SaaS applications to which they have such permissions, including the highest-level security and admin settings. They will thus have full create, read, update, and delete ("CRUD") permissions to a managed data object at the SaaS application level, even when their permissions may be less at the corporate level. If CRUD permission information can be received, a notification of Super Admin permissions can be provided, and corrective action can be taken thereupon. For example, access roles that outline which administrative functions that users (e.g., managed entities and/or third-party actors) can and cannot perform can be defined, and the user can be instructed to adjust his permissions to these values at the SaaS application level. For example, a user can be assigned specific roles and security levels depending on his position, department, etc. Such notifications and actions taken thereupon can be automatic, by an administrator, or both.

Still further, the present disclosure allows the identification of external users that have access to managed data objects that may comprise sensitive or compliance-related data. "External users" can include anyone who is not a recognized employee of an organization but who is associated with completion of one or more tasks on behalf of the organization. Such external users can include freelancers, interns, consultants, contractors, and/or service providers. In a typical situation where a task or activity is conducted only within an organization, a group of users will comprise only employees. However, in a modem corporate environment, external users are often brought on to complete a task or activity. At least due to the fact that these external users are not part of the corporate infrastructure—for example, they do not have human resources files or identifiers that can be tracked—it can be exceedingly difficult to track them for onboarding and offboarding. As a result, such external users can retain access to managed data objects beyond the date when their work is completed. This gives rise to the risk that sensitive, regulated, or compliance-related managed data objects can be improperly accessed by the external users, or even shared by them intentionally or inadvertently. The systems and methods herein allow notification of external users, and such notifications can trigger the recovery of managed data objects to which such users may have had access, such as by removing their access to files, folders, calendars, etc. Such action can be via a centralized location and, in some aspects, can be conducted substantially automatically.

Moreover, users, both internal and external, can often add users very easily. In some cases, end users can create their own groups, add internal and external addresses to groups, and allow anyone inside and outside of an organization to join a group. In some SaaS applications, if the ability to add users is removed as a permission, any external addresses already added will remain in those groups. If an IT administrator does not know about these users, there is no way to manage their access and, as such, managed data objects can be compromised. In accordance with such internal and external user access management, the present disclosure provides a systems and methods to track, manage, audit etc. whether internal and external users have access to managed data objects, such as those comprising sensitive or compliance-related information and, optionally, who these users are, what their roles and responsibilities are, who their contact/supervisors are, among other things. Still further, notice can be provided when internal and external users are added, where such notice results from receivable processing event information. Still further, an internal or external user can be offboarded if it is determined that she is no longer working in or with the organization. Such offboarding can be substantially automatic, or can be conducted by an administrator/manager or both.

When the generated information set is presented in the form of a data graph, an IT manager can visualize processing events performed on one or more managed data objects at the SaaS applications level. This can allow processing events performed on the managed data object(s) to be monitored, tracked, managed, audited etc. from a centralized location. For example, an IT administrator can monitor whether and to what extent a managed data object has been accessed, copied, printed, modified etc. across a plurality of SaaS applications in real time or substantially in real time. Such information is viewable, for example, in a grid form for processing events performed on a single managed data object in Google, Slack, Dropbox, Box, etc. In this regard, rules associated with the managed data object can be consistently applied across a plurality of SaaS applications in accordance with the systems and methods of the present disclosure.

In a further example, the present disclosure can allow automatic management of a plurality of granular actions of a user or a group of users from multiple areas across a plurality of SaaS applications, including memberships, settings, third-party applications, and more. Such actions are indicated by processing event information that is receivable.

In a further aspect, the methods and system herein can be automatically enabled once a first action occurs repeatedly, that is, as a pattern emerges. In this regard, when specific actions associated with a managed data object are indicated to be out-of-compliance with one or more rules, the system can automatically address, such as by mitigation, the effect of the-out of-compliance processing event, thereby creating a substantially self-healing environment.

Yet further, rules can be associated with a managed data object or class/type of managed data objects as a function of authorized and unauthorized activities within a time period, location, and/or number of actions. For example, a rule can be generated that allows a managed data object that is of the class "marketing brochures" to be downloaded up to x number of times per hour by a third-party user who is located within a certain geographical location or who is associated with a particular IP address. If a user is associated with a location or an IP address that is that of a competitor, the marketing brochures can be limited to one (or none) per a time period. Still further, a rule can be generated to provide a notification when more than x number of files are downloaded in y time period from IP addresses that are not associated with a company's internal network.

In further aspects, the present disclosure allows an administrator to identify from a centralized vantage point, such as a dashboard, when managed data objects incorporate a sharing setting of interest, for example, public sharing, group sharing, external sharing even if non-public, or the like, and to determine whether and to what extent such managed data objects have been shared both within and outside of the organization. In conjunction with this implementation, an IT administrator can also determine whether a one or a plurality of SaaS applications retains access to the managed data object, irrespective of whether the administrator has administrative control over those one or more SaaS applications. In a further implementation, the sharing of managed data objects outside of an organization, that is, via one or more SaaS applications can be monitored, managed, audited etc. Such notice of sharing can be provided via an information set incorporating processing information generated from the SaaS applications, where such information set can be configured into one or more data graphs. Further aspects can allow the identity of the person or entity with which the managed data object is being shared to be identified, for example, a competitor etc. For example, if a user shares a managed data object comprising sensitive, regulated, or compliance-related information, notification of such sharing can be provided, and action can be taken thereupon as described elsewhere herein. For example, when the managed data object is a file or calendar and the sharing setting of interest is "public," an administrator can determine whether such file or calendar was shared publicly, as well as to identify the users who still retain access to such file or calendar. Yet further, the present disclosure can identify SaaS applications that possess at least some access to the files or calendars.

As would be appreciated, providing an administrator with the ability to gain visibility as to whether and to what extent a managed data object is accessible outside of a specific user, group, organization, etc. can enhance information security in a computing network. If an authorized party possesses access to an organization's sensitive, regulated, or compliance related managed data objects—be it in the form of files, calendars, devices, or otherwise—the organization may lose competitive advantage and/or be subjected to regulatory action.

The administrator can also gain insights into whether a particular managed entity is in compliance with rules associated with her position or department. For example, if an employee is found to be accessing files that are not associated with her job description, it might be inferable that the person needs management intervention, such as by counseling or even termination.

To determine whether a rule associated with a managed data object and/or managed entity as been out-of-compliance with an associated rule, from time to time, an audit can be conducted. Auditing is an effective strategy for passively monitoring compliance with established managed data object rules. Because in most cases audits will not be actively interfering with end users' use of a SaaS applications, it is a low-touch approach to enforcing rules regarding managed data objects. Compared to a more active strategy (e.g., a data loss prevention policy which alters document permissions or sends alerts), passive audits can provide the owner or manager of a managed data object with the flexibility to decide which processing events require action. Even if an organization does not have a strict or clearly defined rule for a managed data object type, a periodic audit can offer valuable insights into how managed data objects are being handled both internally and externally, as well as to the manner that employees and other with access to the managed data objects are behaving in the cloud computing environment. The scope of external managed data object exposure revealed by an audit can generate insights as to whether more aggressive measures, such as managed data object recapture or user permission revocation, need to be taken to prevent a data breach from occurring or to mitigate damage from one that has already occurred.

Managed data objects that are suitable to share at the management level may be problematic, or even illegal, to share more broadly in the organization. Thus, managed data object and user context can be relevant in a cloud computing environment. If someone is given access to a type of managed data object and then moves to another position in the organization, access to the managed data object type that was relevant to her first position may not be relevant to her current position, and access to that previously relevant managed data object may even be prohibited. Thus, it could be beneficial to revoke access to managed data objects that are no longer applicable to her current position. In some, but not all, situations, it may also be appropriate to revoke or modify the permissions to other users for the managed data objects to which the first person granted access. If the first person is no longer collaborating with others in relation to one or more managed data objects, the present disclosure allows permissions granted to the first person to be automatically revoked or modified upon the first person's status change modification. The permissions of others to managed data objects that was given by her can also optionally automatically be revoked or modified upon the first person's status change notification.

As a non-limiting example of this implementation, when a user's internal job description is updated in a human resources or other database, such status change can be provided to the administrator automatically via notification. For example, if a user's department number is changed, that change can be provided to the IT department, and access to managed data objects and permissions associated therewith can be automatically generated. The system can be configurable to substantially automatically identify all managed data objects—where such managed data objects have been processed in accordance with aspects of the present disclosure—that are associated with the user's prior position, and access to those managed data objects can be revoked or modified according to a generated policy. Managed data objects that the user shared with or to which she granted access to third parties prior to the status change can be identified and actions can be taken thereon as appropriate. Such sharing or access can be identified in relation to the status or location of the third party, for example, if he is an employee of the organization or if he is someone who is not a recognized employee of the organization the third party's permissions with respect to the identified managed data objects can be revoked or modified according to a generated policy.

In some aspects, the assess or permissions to the managed data objects can optionally be revoked depending on the user and context. In some cases, all permissions granted by the first person may be revoked. In other cases, only the permissions of persons outside of the organization may be revoked. Yet further, permissions held by only some of the persons to the shared managed data object may be revoked, whether or not they are inside or external to the organization. In this latter case, the person changing positions may maintain certain external staffing, such as freelancers or consultants, who report to her directly on a regular basis. Such persons would not need to maintain access to the managed data objects pertinent to the first person's prior position, and it would be beneficial, if not imperative, for their access to be revoked to the managed data objects to which her access was revoked. In contrast, any persons who remained as freelancers or consultants to the department or, more specifically, project, would need to retain access to the managed data object after the first person changed position.

In separate aspects, the systems and methods herein are configurable to allow determination of the relationships between users, groups, etc. and to define rules pertinent to managed data object access, where such policies are associated with the type of relationship between users, groups, etc. For example, a manager can be associated with the employees that she supervises, her manager(s), and any users, groups, etc. that are defined as support for her department. Other users or groups can be associated with their functions: for example, human resources persons can be associated with department managers etc.

A newer issue with the unfettered access that many SaaS applications provide to third party users is the ability that such access may provide to those with nefarious intentions. To this end, if an external user is given access to sensitive data by way of being granted permissions that are native to a SaaS application associated with a managed data object, the external user can abuse her permissions to misuse the organization's data. It follows that a highly beneficial implementation can be the ability for administrators to visualize and manage the movement of managed data objects between and among a plurality of SaaS applications where the users having access to such managed data objects are both within and external to the organization. This can better enable an organization to ensure that sensitive, regulated, and compliance-related data is not inappropriately used outside of the organization. This also allows an organization to monitor, track, manage, audit, etc. processing of managed data objects among a plurality of SaaS applications so that damage from improper access and/or use of sensitive, regulated, or compliance-related data can be mitigated or even eliminated by the ability to respond quickly to data misuses.

The systems and methods herein can facilitate enforcement of granular rules based on content profiles to prevent potential data leakage scenarios and allow continuous compliance. In another implementation, SaaS applications operating in a cloud computing environment can be retroactively evaluated, such as in an audit situation, against the content profiles for discovering sensitive data that may have already been processed in ways that are out-of-compliance with current rules. In some implementations, the enforcement is global and can apply to substantially all SaaS applications interfacing with the organization's network. In other implementations, the enforcement can be applied to individual SaaS applications or to a category of SaaS applications.

In particular, the systems and methods herein can allow the monitoring, tracking, management, and auditing etc. of managed data objects in a granular context, such as in relation to user, group, location, IP address, device/hardware, service, category, activity, and content, among others. Unlike solutions for which access to SaaS applications is an all-or-nothing proposition, the systems and methods herein can allow organizations fine tune via selection the actions/reactions that are conducted in response to processing events that may be performed on a managed data object or by a managed entity and/or a third-party actor at the SaaS applications level. In other words, the methods herein allow organizations that have a need and/or obligation to track, manage, or maintain an audit trail associated with such managed data objects, managed entities, or third-party actors to do so.

Compliance with a wide variety of generated rules can be evaluated and enforced with the systems and methods herein. As non-limiting examples:

When users download content deemed "confidential" from a cloud storage service to an unmanaged system or device.

When a user attempts to sign into a virtual private network (VPN).

Any user having access to compliance-related information (e.g., human resources, investor relations) shares files, calendars, etc. with someone outside of the organization or downloads such information to a mobile device.

A user downloads or shares contacts from any CRM service

Download of any .exe file from a cloud storage service.

As would be appreciated, security of managed data objects, such as files, calendars, devices, etc. can be affected by a system that evaluates processing events or user actions in accordance to generated rules, and either allows or blocks such processing events. Any processing events performed in a cloud computing environment can then be regulated prior to allowing an action to occur. This "blacklist" and "whitelist" process can slow down the system, frustrate users, and prevent them from doing their jobs. Moreover, the sprawling nature that exists with the proliferation of SaaS applications now, which will be even more prevalent in the future, can be expected to greatly increase the number of actions that need to be checked. Thus, a managed data object security system with or without user access capabilities that operates on a blacklist/whitelist methodology are likely to become too cumbersome to use in an IT environment where SaaS applications is the rule or majority.

Notably, the present disclosure does not "whitelist" or "blacklist" SaaS applications, that is, the systems and methods herein do not first determine whether to allow or block processing event types performed by a particular application prior to allowing a processing event to take place in the cloud computing environment. Instead, the present disclosure allows internal and external users, groups etc. to acquire and deploy for use a plurality of SaaS applications, one or more of which can be heterogeneous with respect to another, to generate the desired functionality for a given operation. Notwithstanding this broad flexibility, the present disclosure can provide administrators, such as an IT department, to monitor, manage, audit, etc. managed data objects and users in the cloud computing environment, even though there may be little or even substantially no administrative control over one or more of the applications themselves. The present disclosure can therefore address the competing and previously often incompatible goals of broad user access to functionality on an as-needed basis and the need for IT administrators to be able to track the movement of and user access to managed data objects.

The present disclosure operates in an alternate managed data object security model in that by providing notification of an out-of-compliance processing event performed on a managed data object, a notification can be provided regarding such event, so that event can be prevented in the future (e.g., notifying a user, removing permissions etc.), damage remedied (e.g., seeking return/deletion of the managed data object), or generating a report thereof (e.g., reporting to an appropriate department or agency as required by policy). The systems and methods herein can facilitate the tracking of managed data objects and the actions of users through and among a plurality of SaaS applications by providing an auditable trail of the managed data objects and user actions within and among the cloud computing environment. For example, the downloading of proprietary data from an organization's database to a SaaS applications storage system (e.g., Dropbox, Google Drive etc.) can be tracked and matched to a managed entity and/or a third-party user. An IT administrator can generate a forensic audit trail showing movement of managed data objects by every cloud service action for that user leading up to and immediately following the incident. This would enable IT not only to uncover suspicious behavior, but also to prove a breach occurred and clearly demonstrate malicious or criminal activity.

Upon receiving of information about a processing event performed on a managed data object that is out-of-compliance with one or more rules, one or a plurality of actions can be affected by the system, including in non-limiting examples, alert, quarantine, coach, initiate a workflow to remediate, record, seek justification, or report on the out-of-compliance event or activity. The type of action effected can be based on at least one of the type of the rule implicated by the action on the managed data object, the activity being performed on the managed data object by each user, and/or the type/content of the managed data object. In other implementations, other actions can be triggered, such as changing the ownership of the managed data object and/or permissions associated therewith.

Referring now to the Figures:

FIG. 1 is a drawing of a computing environment 100 according to various embodiments of the present disclosure. The computing environment includes a plurality of provider computing systems 101a-n. A provider computing system 101 may comprise, for example, a server computer or any other system providing computing capability. Alternatively, the provider computing system 101 may employ a plurality of computing devices arranged, for example, in one or more server banks or computer banks or other arrangements. Such computing devices may be located in a single installation or may be distributed among many different geographical locations. For example, the provider computing system 101 may include a plurality of computing devices that together may comprise a hosted computing resource, a grid computing resource and/or any other distributed computing arrangement. In some cases, the provider computing system 101 may correspond to an elastic computing resource where the allotted capacity of processing, network, storage, or other computing-related resources may vary over time. The provider computing system may implement one or more virtual machines that use the resources of the computing system.

Each provider computing system 101 provides one or more software services 103 in the form of a SaaS application within a cloud computing environment. As discussed hereinabove, one or more of the SaaS applications operational in cloud computing environment can be heterogeneous, as such term is defined in this disclosure. For example, a particular provider computing system 101a may execute a software service 103 such as a messaging or communication service, document creation/management service, CRM service, group collaboration service, hardware device control, etc.

Within a provider computing system, various data is stored in a database 106 or other memory that is accessible to the provider computing system 101. The database 106 may represent one or more databases 106. The database 106 may store managed data objects 109 and user accounts 112. A user account 112 includes information to allow a user to register with the software service 103, access the software service 103, and create, edit, or otherwise manipulate managed data objects 109 handled by the software service 103. User accounts 112 for the software service 103 are used to facilitate a user login. A particular provider computing system 101a creates a different application instance for each user according to a corresponding user account 112. Software services 103 are typically provided on a subscription basis such that subscriptions are tracked according to user accounts 112.

The computing environment 100 includes a network 115 such as the Internet, intranets, extranets, wide area networks (WANs), local area networks (LANs), wired networks, wireless networks, or other suitable networks, etc., or any combination of two or more such networks. The provider computing systems 101a-n provide cloud computing services over the network 115.

The computing environment 100 further includes a management platform 118 connected to the network 115. This platform 118 embodies the various systems and implements the various methods described in the present disclosure. The platform 118 is a computing system. The platform 118 may be deployed as a private cloud, a community cloud, a public cloud, or a hybrid cloud. The platform may comprise, for example, a server computer or any other system providing computing capability. Alternatively, the platform 118 may employ a plurality of computing devices that may be arranged, for example, in one or more server banks or computer banks or other arrangements. Such computing devices may be located in a single installation or distributed among many different geographical locations. For example, the platform 118 may include a plurality of computing devices that together may comprise a hosted computing resource, a grid computing resource and/or any other distributed computing arrangement. In some cases, the platform 118 may correspond to an elastic computing resource where the allotted capacity of processing, network, storage, or other computing-related resources may vary over time. The platform may implement one or more virtual machines that use the resources of the computing system.

The platform 118 forms part of the cloud computing environment discussed above. The platform 118 executes a management application 121 that provides the functionality described above with respect to managed data objects 109 and entities 127. The management application 121 may be implemented as a multi-tenant SaaS application that interfaces with various heterogeneous software services 103 of different provider computing systems 101a-n.

Within the platform 118, various data is stored in a database 124 or other memory that is accessible to the platform 118. The database 124 may represent one or more databases 124. The database 124 may store managed entities 127, managed entity identifiers (IDs) 130, persistent IDs (PIDs), compliance records 136, rules 139, and permissions 142. A managed entity 127 reflects information about an actor such as, for example, a user, that interacts with a managed data object 109. This may include a user name, account information, or other data associated with a user or actor. The managed entity ID is an identifier to uniquely identify a managed entity 127. A PID 133 is assigned to a corresponding managed data object 109 to allow management and tracking of the managed data object 109. A database record 139 such as a compliance record (also referred to a non-compliance record) is a data log reflecting actions taken on a managed data object 109 and an indication of whether the action is in compliance with one or more of a permission 142 or rule 139. Rules 139 may include policies or protocols that govern how managed data objects 109 should be processed or otherwise manipulated in computing environment 100. The generation of a rule 139 may be associated with one or more permissions 142. In this regard the permissions 142 may be associated with one or more rules 139 definable for either or both of the managed data objects 109 or identified managed entity 127; and one or more processing events performable on the managed data objects 109 by the identified managed entity 127.

The computing environment 100 further includes a client environment 145 connected to the network 115. The client environment can include the various client devices associated with a particular organization. This may be the collection of an organization's laptops, mobile devices, desktops, servers, tablets, IoT devices, vehicles, or other hardware devices having computing capability. Users of these client devices can interact with the software services 103 of the cloud computing environment 100. The management application 121 tracks the actions and activities initiated from the client environment as users process managed data objects 109. The client environment 145 refers to any client device used to process managed data objects 109. The client environment 145 as described herein can also refer to client devices used by unauthorized users who falsify their identities to breach an organization's security.

Within the computing environment 100, a processing event 148 is triggered from the client environment 145. A processing event 148 may be triggered by a managed entity using a client device within the client environment 145 or by a third-party actor operating outside of the client environment, where such third party action is associated with one or more managed data objects 109. A processing event 145 may also be triggered automatically by a script or program that automates processing events 145 to be generated.

A processing event 145 includes an instruction or command that is sent to a particular software service 103 for the purpose of accessing (e.g., downloading), creating, viewing, merging, altering, sharing, sending, copying, printing, deleting, or modifying of the managed data objects a managed data object 109.

Within the computing environment 100, processing event information 151 is received by the management platform 118. For example, the platform is made aware of any processing events 148 by monitoring the actions taken by various software services 103. The management application 121 may use SaaS vendor-available APIs to receive information about data changes and events associated with processing of managed data objects 109.

Within the computing environment 100, the platform 118 generates data/alert 154. The data/alert 154 may be real-time data that indicates different analytics on processing events, reports that reflect processing events, records of non-compliance where a processing event violates a rule 139 or a permission 142. The data/alert 145 may also be generated in conjunction with a data graph that graphically depicts information pertaining to processing events 148 triggered by a client environment 145. The data alert 154 provides centralization of a plurality of SaaS applications, even though one or more of the SaaS applications are heterogeneous.

FIGS. 2A-D represent examples of portions of the functionality of the management application 121 (FIG. 1) executed in a computing environment 100 of FIG. 1, according to various embodiments of the present disclosure. It is understood that the flowcharts of FIGS. 2A-D provides examples of the many different types of functional arrangements that may be employed to implement the operation of the portion of the management application 121 as described herein. As an alternative, the flowcharts of FIG. 2A-D may be viewed as depicting an example of elements of a method implemented in the computing environment 100 according to one or more embodiments.

FIG. 2A shows an example of handling a suspicious login 202 with respect to a select user such as, for example, a corporate officer of an organization. FIG. 2A depicts an example of a single action policy relating to a predefined rule 139 (FIG. 1). An organization may wish to protect select users from security breaches by implementing a rule 139 that monitors suspicious logins. This can mitigate damage if a select user's account is compromised.

As shown in FIG. 2A a suspicious login 202 may occur. The suspicious login may be determined by evaluating whether a particular IP address associated with a login attempt is outside a range or is otherwise whitelisted/blacklisted, whether the login attempt occurs at an anomalous time (e.g., 2AM), whether the login time is inconsistent or logically impossible with the select user's schedule (e.g., login attempt during a select user's travel), or any combination of such factors. Upon detecting a suspicious login 202, the management application 121, determines whether the suspicious login 202 applies to a select user 205. If not, the management application 121 continues monitoring. If so, the management application 121 takes a predefined action such as, for example, suspending the select user's account 207 such one or more user accounts 112 (FIG. 1) of software services 103 (FIG. 1) associated with the select user.

FIG. 2B shows another example of a single action policy. In FIG. 2B, the management application 121 monitors whether a user connects to an untrusted VPN 208. This type of action my increase the risk of a security breach by providing a lack of visibility into a user activity 211. Upon detecting an untrusted connection, the management application 121 may take action, in the manner described above with respect to FIG. 2A and/or it may send an alert 154 (FIG. 1) to a predetermined recipient such as an IT manager or network administrator.

FIG. 2C shows an example of a multi-action policy created by a plurality of rules 139. In this example, the management application 121 detects both a suspicious login 202 and a processing event 148 (FIG. 1) such as, for example, downloading a particular file type 231. If both rules are triggered with respect to a predefined time (e.g., both events occur within 2 minutes of each other), then the management application 121 may take action, in the manner described above with respect to FIG. 2A and/or it may send an alert 154.

FIG. 2D shows another example of a multi-action policy created by a plurality of rules 139. In FIG. 2D, a user may login 214 and then perform sequence of processing events 148 such as repeatedly downloading a file 217/220. If the sequence of processing events 154 take place over a predefined time 223, then the management application 121 may take action, in the manner described above with respect to FIG. 2A and/or it may send an alert 154.

Figure 3:
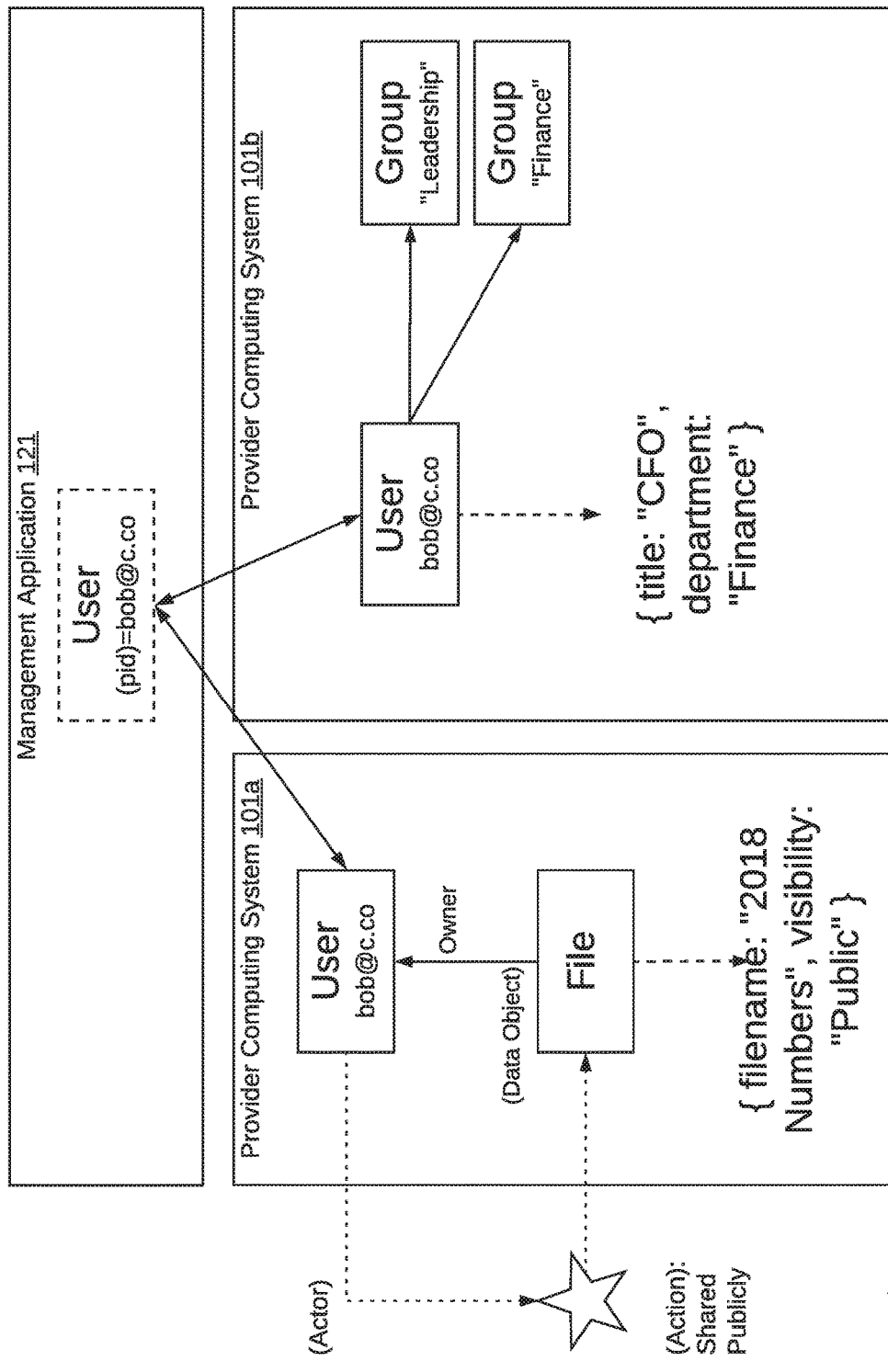
FIG. 3 depicts an example of how a management application manages an entity that uses the services provided by a plurality of provider computing systems, according to various embodiments of the present disclosure.

FIG. 3 depicts an example of how the Management Application 121 of FIG. 1 manages an entity 127 (FIG. 1) that uses the services 103 (FIG. 1) provided by a plurality of provider computing systems 101a-n (FIG. 1), according to various embodiments. In the example of FIG. 3, the first provider computing system 101a is a cloud storage system for allowing a user to upload and download his files so that the files can be accessed remotely and potentially shared with the public. The management application 121 creates and assigns a persistent ID (PID) 133 (FIG. 1) to the user. In this example, that PID for the managed entity is "bob@c.co." The user may then perform processing events 148 (FIG. 1) (e.g., download, upload, edit, etc.) relating to a managed data object 109 such as a file. In this case, the user is considered a managed entity. Not shown in FIG. 2A is one or more users with which the managed entity can interact with in the computing environment 100, but whom is not a managed entity. In this regard, the outside user is an "actor" in the framework of the present disclosure. In addition or in the alternative, the user may execute a script or use an automated process to initiate processing events 148.

In FIG. 3, the user also uses a second provider computing system 101b that provides a different, second software service 103, which may be heterogeneous in relation to the first (or other) software services operational in cloud computing environment 100. In this example, the second software service 103 is a file sharing service such as a messaging or email service. The second software service 103 allows the user to receive or share documents with different groups or channels such as, for example, a "Leadership" group or a "Finance" group.

As the user logs in and uses the various software services 103 provided by different providers, the risk of sharing sensitive documents increases. To alleviate the risk, the management application 121 applies one or more associated rules and/or permissions to monitor activity that could lead to data loss.

FIG. 3 shows how a document received from a second provider computing system 101b might be inadvertently shared with the public using a first provider computing system 101a. The management application 121 is configured to monitor for such undesired activity. The management application 121 may be configured to monitor activity with respect to a rule 139 that prohibits the public sharing of files created by the Finance Group. The management application 121 continuously tracks processing event information 151 (FIG. 1) relating to the various provider computing systems 101a and 101b. If processing event information 151 associated with a PID 133 (FIG. 1) is subject to a particular rule 139, the management application 121 may take action, such as by generating an alert 154 (FIG. 1) or by modifying or revoking a permission 142. In the example of FIG. 3, when the user who uses the first provider computing system 101a to publically share the file, as prohibited by a rule 139, the management application 121 responds by generating an alert 154.

Figure 4:
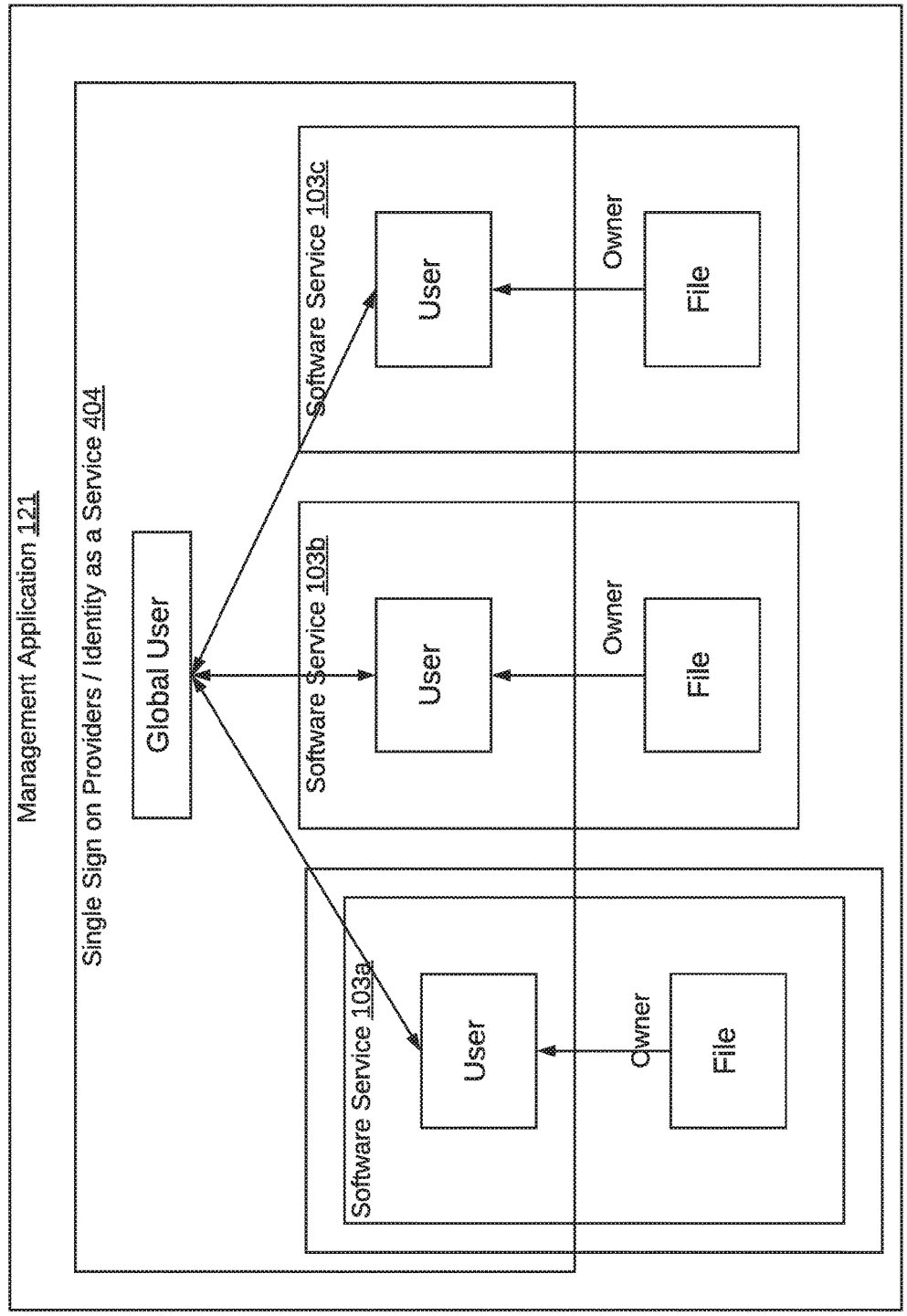
FIG. 4 provides an example of the functionality of the management application as an improvement over prior solutions.

FIG. 4 provides an example of the functionality of the management application 121 as an improvement over prior solutions. In FIG. 4, and management application 121 provides services beyond a single sign-on provider/identity as a service 404. Item 404 represents the limited ability of providing a single login or portal to multiple heterogeneous application services. In addition to that, the management application 121, provides a platform that does not only monitor user login or user accounts, it also monitors how entities are using or otherwise manipulating managed data objects 109 processed by one or more heterogeneous software services 103 operational in a computing environment 100.

Figure 5:
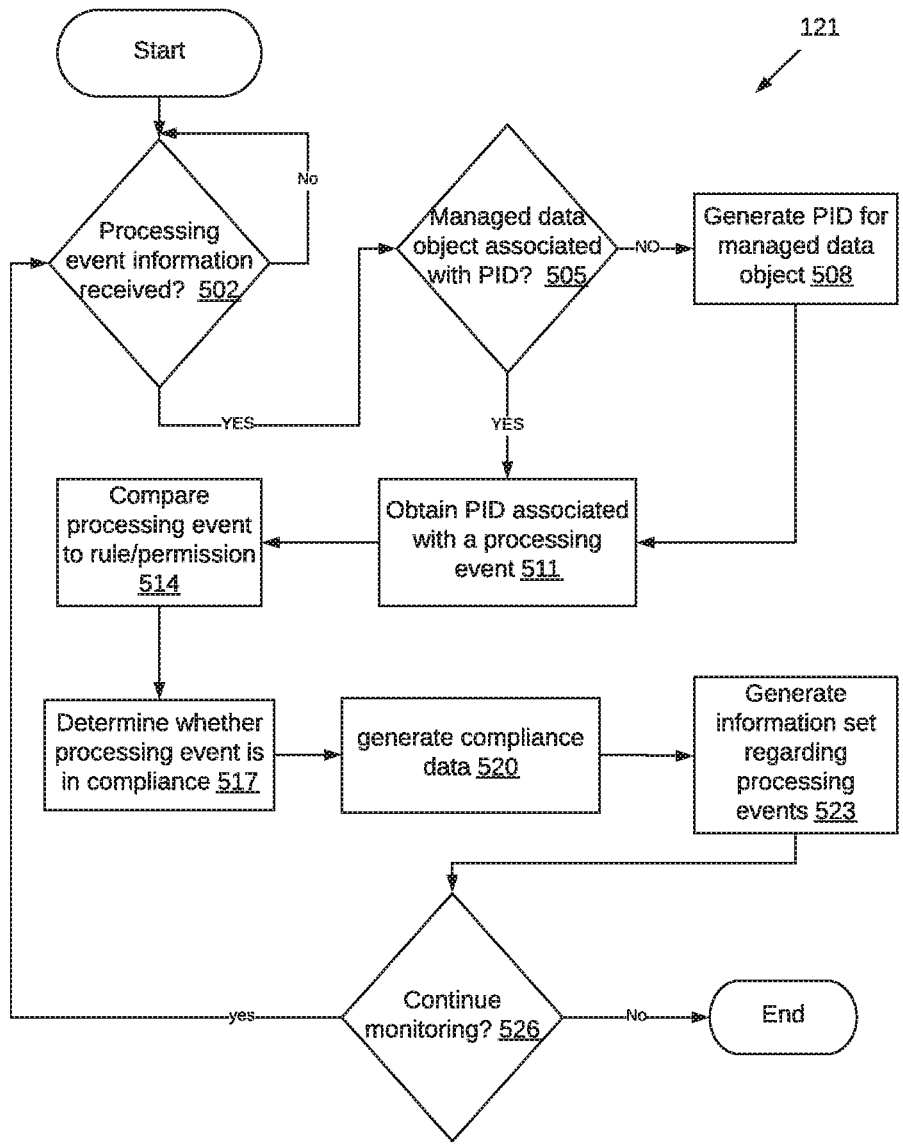
FIG. 5 is a flowchart that provides an example of the operation of the management application according to various embodiments of the present disclosure.

FIG. 5 is a flowchart that provides an example of the operation of the management application 121 according to various embodiments. It is understood that the flowchart of FIG. 5 provides merely an example of the many different types of functional arrangements that may be employed to implement the operation of the portion of the software application as described herein. As an alternative, the flowchart of FIG. 5 may be viewed as depicting an example of elements of a method implemented in the computing environment 100 (FIG. 1) according to one or more embodiments.

Beginning at 502 the management application 121 monitors for processing events taking place within the computing environment 100. According to some embodiments, the management application 121 receives API information from various provider computing systems 101a-n (FIG. 1). The management application 121 monitors for SaaS activity taken by various users (e.g., managed entities and third-party actors) who use SaaS accounts associated with the computing environment of a particular organization. When processing event information 151 (FIG. 1) is received 502, the management application 121, parses the processing event information, which may include extracting information from an API generated by software service 103 executing in a provider computing system 101.

At 505, the management application 121 identifies a managed data object 109 (FIG. 1) associated with the processing event information 151. For example the processing event information 151 may indicate that "file x" is made available via a public URL. In this case, "file x" is the managed data object 109 and the event of "sharing via a link" is a processing event 148 (FIG. 1) triggered by an actor associated with a client environment 145 (FIG. 1). The management application 121 determines whether the managed data object 109 is associated with a PID 133. The management application 121 cross-references a database 124 (FIG. 1) to determine if a PID for the managed data object 109 exists. If not, then, at 508, the management application 121 generates a PID for the managed data object and stores it in the database 124 for future use. If a PID exists, then, at 511, the management application 121 obtains the PID associated with the processing event 148.

At 515, the management application 121 compares the processing event 148 with a permission 142 (FIG. 1) or rule 139 (FIG. 1). For example, a permission 142 or rule 139 may relate to what processing events 148 should or should not be taken with respect to what managed data objects 109. To identify a managed data object 109, the management application 121 uses a PID. In some embodiments, the management application 121 may also use an entity ID (130) to track certain entities 127 (FIG. 1) in relation to permission 142 or rule 139. However, unmanaged entities such as, for example, third party actors, would not have corresponding entity IDs.

At 517, the management application 121 determines whether the processing event is in compliance 517. Here, the management application 121 checks whether a permission 142 or rule 139 is violated based on the managed data object 109 and/or the entity 127 who triggered the processing event 148. At 520, the management application 121 generates compliance data or record 136 (FIG. 1). This may involve updating a record of non-compliance that reflects each time a permission 142 or rule 139 is violated. According to some embodiments, the management application 121 generates data or an alert 154 (FIG. 1) reflecting the record of non-compliance.

At 523, the management application 121 creates an information set regarding one or more processing events. For example, the management application 121 may generate a data graph or report that provides compliance data on a periodic basis. The management application 121 may provide a real-time stream of the processing event information so that a manager/administrator can monitor the activity of the client environment 145.

At 526, the management application 121 continues to monitor for processing events 148 unless the application is terminated.

Figure 6:
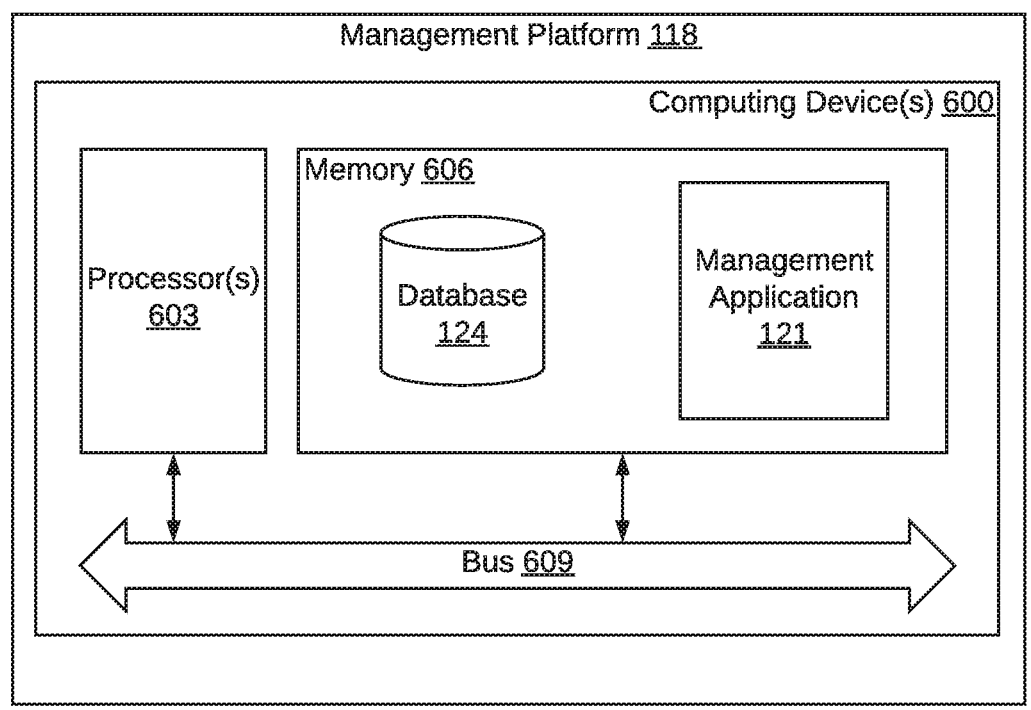
FIG. 6 shows a schematic block diagram of the management platform of FIG. 1, according to an embodiment of the present disclosure.

FIG. 6 shows a schematic block diagram of the management platform 118 according to an embodiment of the present disclosure. The platform 118 includes one or more computing devices 600. Each computing device 600 includes at least one processor circuit, for example, having a processor 603 and a memory 606, both of which are coupled to a local interface 609 or bus. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the management application 121. Also stored in the memory 606 may be a database 103 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

Several software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the management application 121 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of the management application 121. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more boxes may be scrambled relative to the order shown. Also, two or more boxes shown in succession in FIG. 5 may be executed concurrently or with partial concurrence. Further, in some embodiments, one or more of the boxes shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The management application 121 may also comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the management application 121, may be implemented and structured in a variety of ways. For example, one or more applications described may be implemented as modules or components of a single application. Further, one or more applications described herein may be executed in shared or separate computing devices or a combination thereof. For example, the software application described herein may execute in the same computing device 600, or in multiple computing devices in the same computing system 603. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method of managing data objects in a cloud computing environment comprising the steps of:
   a. managing, by a computing system, a plurality of managed data objects in a cloud computing environment,
      wherein the cloud computing environment comprises a plurality of Software as a Service (SaaS) applications configured to process the plurality of managed data objects,
      wherein at least two of the plurality of SaaS applications are heterogeneous, wherein each of the plurality of managed data objects are independently associated with one or more managed entities,
      wherein each managed entity has an entity identification, thereby providing a plurality of managed data objects associated with an identified managed entity;
      wherein either or both of the plurality of managed data objects or managed entities are each independently associated with one or more permissions definable by a manager of each of the plurality of managed data objects or each of the managed entities,
      wherein the permissions are associated with one or more rules definable for either or both of: (1) the managed data objects or identified managed entity and (2) one or more processing events performable on the managed data objects by one more actors,
      wherein at least some of the processing comprises the one or more processing events, and
      wherein the one or more processing events comprises one or more of accessing, creating, viewing, merging, altering, sharing, sending, copying, printing, deleting, or modifying of the managed data objects;
   b. receiving, by the computing system, information about the one or more processing events;
   c. determining, by the computing system, whether each of the managed data objects is, independently, associated with a persistent identifier (PID) and, if any of the managed data objects is not associated with a PID, generating a PID for each non-PID-associated managed data object, thereby providing a plurality of managed data objects, wherein each is independently associated with a PID;
   d. generating, by the computing system, an information set identifying each of the one or more processing events performed on each of the PID-associated managed data objects in the cloud computing environment, thereby providing status information for the state of the processing events performed by the one or more actors on the PID-associated managed data objects in the cloud computing environment;
   e. comparing, by the computing system, each of the processing events performed by the one or more actors on the PID-associated managed data objects with the one or more of the one or more rules; and
   f. generating, by the computing system, information about whether the one or more processing events performed on one or more of the PID-associated managed data objects is out of compliance with one or more of each of the associated rules.

2. The method of claim 1, wherein an entity identification is derivable for each of the PID-associated managed data objects and wherein the derived entity identification is the same or different from the entity identification for the identified managed entity.

3. The method of claim 2, wherein the derived entity identification is generated from the processing of some or all of managed data object metadata, SaaS application metadata, and the managed data objects in the cloud computing environment.

4. The method of claim 2 further comprising the step of generating a global identity from the derived entity identification.

5. The method of claim 1, wherein the one or more actors include the identified managed entity.

6. The method of claim 1, wherein the one or more actors, optionally, do not include the identified managed entity.

7. The method of claim 1, further comprising generating a record of non-compliance in response to determining that the one or more processing events is out of compliance.

8. The method of claim 1, further comprising sending a notification of non-compliance to one or more of the identified managed entity, the actor, the system administrator, or a database record in response to determining that the one or more processing events is out of compliance.

9. The method of claim 8, wherein the rules are selectively definable for each identified managed entity, actor, and managed data object, thereby providing a plurality of notification types for each processing event performed on each managed data object.

10. The method of claim 9, wherein the one or more permissions are modifiable in response to each of the one or more notification types.

11. The method of claim 10, wherein the one or more permissions are selectively modifiable, independently, for each identified managed entity, actor, and managed data object, thereby providing a plurality of permission modification types for each processing event performed on the managed data objects.

12. The method of claim 1, wherein the identified managed entity is employed, supervised, or owned by an entity that either or both of: defines or applies either or both of the rules or permissions.

13. The method of claim 1, wherein the information set is provided in the form of a data graph that is viewable on a monitor, printable on a device, or storable in a database.

14. A method of managing data objects in a cloud computing environment comprising the steps of:
   a. managing, by a computing system, a plurality of managed data objects in a cloud computing environment,
      wherein the cloud computing environment comprises a plurality of Software as a Service (SaaS) applications configured to process the plurality of managed data objects,
      wherein at least two of the plurality of applications are heterogeneous,
      wherein at least some of the plurality of managed data objects are each, independently associated with one or more managed entities,
      wherein each managed entity, independently, has an entity identification, thereby providing a plurality of managed data objects associated with an identified managed entity,
      wherein at least some of the plurality of managed data objects are each, independently associated with one or more permissions definable by an owner, manager, or administrator of each of the plurality of managed data objects,
      wherein the permissions are associated with one or more rules definable for either or both of the (1) managed data objects or the identified managed entity and (2) one or more processing events performable on the managed data objects by one more actors,
      wherein at least some of the processing comprises one or more processing events taken by the one or more actors on at least some of the plurality of managed data objects, and
      wherein the one or more processing events comprises one or more of accessing, creating, viewing, merging, altering, sharing, sending, copying, printing, deleting, or modifying;
   b. receiving, by the computing system, information about the one or more processing events taken by the one or more actors on some or all of the managed data objects, wherein the one or more processing events result from processing of the managed data objects in the plurality of SaaS applications in the cloud computing environment;
   c. determining, by the computing system, whether each of the managed data objects is, independently, associated with a persistent identifier (PID) and, if any of the managed data objects are not associated with a PID, generating a PID for each non-PID-associated managed data object, thereby providing a plurality of managed data objects wherein each is, independently, associated with a PID;
   d. generating, by the computing system, an information set identifying each of the processing events performed by the one or more actors on each of the PID-associated managed data objects in the cloud computing environment, thereby providing status information of the processing events performed by the one or more actors on the PID-associated managed data objects in the cloud computing environment,
   e. wherein the information set is provided in the form of a data graph that is viewable on a monitor, printable on a device, or storable in a database;
   f. optionally comparing, by the computing system, each of the processing events performed by the one or more actors on the PID-associated managed data objects with one or more of the rules associated with either or both of the managed data objects and one or more of the identified managed entities; and
   g. generating, by the computing system, information about whether one or more of the processing events performed by the one or more actors on one or more of the PID-associated managed data objects is out of compliance with one or more of each of the associated rules.

15. The method of claim 14, wherein an entity identification is derivable from the PID-associated managed data objects, the derived entity identification is the same or different from the managed entity, and is generated from processing of metadata associated with at least some of the managed data objects, SaaS applications, and managed data objects.

16. The method of claim 14, wherein the policy out-of-compliance information is generated, and a notification of the non-compliance is provided to one or more of the managed entity, the actor, the system administrator, or a database record.

17. The method of claim 16, wherein the policies are selectively definable for each managed entity, actor, and managed data object, thereby providing a plurality of notification types for each taken action.

18. The method of claim 17, wherein one or more permissions are associated with either or both of the managed entity or the actor.

19. The method of claim 18, further comprising the step of modifying one or more of the permissions when an out of compliance notification is generated, wherein the permission modifications are selectively definable for each managed entity, actor, and managed data object, thereby providing a plurality of permission modification types for each processing event performed on the managed data objects.

20. The method of claim 14, wherein the PID is stored in the database, wherein the step of determining whether each of the managed data objects is, independently, associated with the PID comprises cross referencing the database to determine if a respective PID exists for each managed data object.

* * * * *